United States Patent [19]
Wong

[11] Patent Number: 6,018,757
[45] Date of Patent: Jan. 25, 2000

[54] ZERO DETECT FOR BINARY DIFFERENCE

[75] Inventor: Roney S. Wong, Sunnyvale, Calif.

[73] Assignee: Samsung Electronics Company, Ltd., Seoul, Rep. of Korea

[21] Appl. No.: 08/695,142

[22] Filed: Aug. 8, 1996

[51] Int. Cl.⁷ .............................. G06F 7/00; G06F 7/50
[52] U.S. Cl. ........................................... 708/525; 708/211
[58] Field of Search ..................... 364/736.5, 715.04, 364/715.09; 395/591; 708/525, 205, 211

[56] References Cited

U.S. PATENT DOCUMENTS

| | | | |
|---|---|---|---|
| 3,573,726 | 4/1971 | Towell et al. | 340/146.1 |
| 4,573,137 | 2/1986 | Ohhashi | 364/788 |
| 4,631,696 | 12/1986 | Sakamoto | 364/748 |
| 4,685,079 | 8/1987 | Armer | 364/784 |
| 4,764,888 | 8/1988 | Holden et al. | 364/788 |
| 4,878,189 | 10/1989 | Kawada | 364/736.5 |
| 4,924,422 | 5/1990 | Vassiliadis et al. | 364/715.09 |
| 5,020,016 | 5/1991 | Nakano et al. | 364/736.5 |
| 5,027,308 | 6/1991 | Sit et al. | 364/748 |
| 5,038,313 | 8/1991 | Kojima | 364/736.5 |
| 5,060,243 | 10/1991 | Eckert | 377/28 |
| 5,241,490 | 8/1993 | Poon | 364/715.04 |
| 5,257,218 | 10/1993 | Poon | 364/787 |
| 5,367,477 | 11/1994 | Hinds et al. | 364/736.5 |
| 5,396,445 | 3/1995 | Lal | 364/788 |
| 5,448,509 | 9/1995 | Lee et al. | 364/737 |
| 5,469,377 | 11/1995 | Amano | 364/748 |
| 5,508,950 | 4/1996 | Bosshart et al. | 364/736.5 |
| 5,519,649 | 5/1996 | Takahashi | 364/736.5 |
| 5,561,619 | 10/1996 | Watanabe et al. | 364/736.5 |
| 5,581,496 | 12/1996 | Lai et al. | 364/736.5 |
| 5,586,069 | 12/1996 | Dockser | 364/736.5 |
| 5,600,583 | 2/1997 | Bosshart et al. | 364/736.5 |

OTHER PUBLICATIONS

Paper entitled: "An American National Standard—IEEE Standard for Binary Floating–Point Arithmetic", ANSI/IEEE Std 754–1985, Standards Committee of the IEEE Computer Society, Title page. Foreward page, Contents page, and pp. 7–18, 1985.

*Primary Examiner*—David H. Malzahn
*Attorney, Agent, or Firm*—Skjerven, Morrill, MacPherson, Franklin & Friel LLP

[57] ABSTRACT

Zero detect of a difference of binary operands is disclosed. If the difference is zero, the bit-complement of the difference is a string of one's, and therefore incrementing the string of one's generates a carry-out bit of one. Likewise, if the difference is non-zero, the bit-complement of the difference will contain one or more zero's, and therefore incrementing the bit-complemented difference will generate a carry-out bit of zero. The operands include a minuend and M subtrahends. One embodiment includes providing a result representing a bit-complement of the difference, and then inspecting a carry-out bit generated by incrementing the result. Another embodiment includes bit-complementing the minuend, generating a first carry-out bit from a sum of the bit-complemented minuend and the M subtrahends, generating a second carry-out bit from a sum of the bit-complemented minuend and the M subtrahends and a constant of one, and setting a zero detect flag to TRUE when the first and second carry-out bits have different logical values. Advantageously, the first and second carry-out bits can be generated concurrently using propagate-generate sections coupled to carry chains to provide rapid zero detect. The invention is well-suited for providing zero detect of the difference A−B where A and B are n-bit binary operands, as well as zero detect of the difference A−B−C where A and B are n-bit binary operands and C is a carry-in bit.

57 Claims, 19 Drawing Sheets

ZERO DETECT FOR BINARY DIFFERENCE

BACKGROUND OF THE INVENTION

1. Field of the Invention

The present invention relates to zero detection, and more particularly to detecting whether a difference of binary operands is zero.

2. Description of Related Art

In general purpose computers, program control is often implemented using conditional branches. In general, conditional branches are used in any programming situation in which one of two possible paths for continuing computation must be chosen. The branch decision is usually based on an arithmetic or logic property, or condition, of the result of a recently performed operation. The branch decision may be based, for instance, on whether a single operand is zero, positive or negative. The branch decision may also be based on whether a first operand is greater than, greater than or equal to, equal to, less than or equal to, or less than a second operand. These conditions are usually evaluated by inspecting condition code bits, or flags, in a condition code register. Computer systems often have four condition code flags: N (negative), C (carry), V (overflow), and Z (zero). The negative flag is set to one if the result is negative and is otherwise set to zero. The carry flag is set to one if a carry-out results from the operation and is otherwise set to zero. The overflow flag is set to one if an arithmetic overflow occurs and is otherwise set to zero. Finally, the zero detect flag is set to one if the result is zero and is otherwise set to zero.

A zero detect flag (or zero flag) based on a difference of the operands indicates whether the operands are equal. When the operands are equal, the difference between the operands is zero, and the zero detect flag is set to TRUE. Likewise, when the operands are unequal, the difference between the operands is nonzero, and the zero detect flag is set to FALSE. In this manner, zero detect of a binary difference can provide the Z (zero) condition code flag for a branch decision.

The difference of two binary operands (A−B) is obtained by subtracting the subtrahend (B) from the minuend (A). In 2's complement representation, the sign of the subtrahend is changed by adding one to the bit-complement of the subtrahend. The binary difference can be provided using a forced carry technique, in which the minuend and the bit-complemented subtrahend are applied to an adder, and the carry-in bit for the least significant bit position of the adder is set to one. In this manner, the difference of A−B is obtained by applying A and the bit-complement of B to a sum-plus-one adder.

Zero detection determines whether every bit in a string of bits is a zero. That is, if a string of bits contains all zero's then the zero detect flag is set to TRUE, whereas if the string of bits contains a one (or several one's) then the zero detect flag is set to FALSE.

FIG. 1 illustrates a known circuit 100 for performing zero detection of a difference of two n-bit binary operands A and B. The B operand is applied to inverter circuit 102 that provides a bit-complemented B operand ($\overline{B}$) at its output. The operands A and $\overline{B}$ are applied to a sum-plus-one adder, shown as a carry lookahead adder which includes PG generator 104, carry chain 106 having a carry-in bit set to one, and sum generator 108. Although other adders can be used, the carry lookahead adder provides a sum more rapidly than, for instance, a carry-ripple adder. The n-bit sum of operands A and $\overline{B}$ and one, which represents the difference of A−B, is provided by output stages n-1, n-2, ... 1, 0 of sum generator 108. Zero detect logic is provided by n-input OR gate 110 and inverter 112. OR gate 110 has inputs coupled to each output stage of sum generator 108. OR gate 110 outputs a logical 0 when the bit string in the output stages consists of zero's, and outputs a logical 1 when the bit string in the output stages includes any one's. Inverter 112 complements the output of OR gate 110. Thus, the output of inverter 112 provides a zero detect flag for the difference of operands A and B. Drawbacks to this approach include the increased fan-in of OR gate 110, and delays associated with calculating the difference of A and B and ORing each bit of the difference.

Another known technique for zero detect of a binary difference includes calculating the difference, serially right-shifting the difference, and inspecting the shifted-out bits one at a time. As soon as a shifted-out bit is detected as being a one, the zero detect flag is set to FALSE. Alternatively, if all shifted-out bits are zero's then the zero detect flag is set to TRUE. A drawback to this approach is that the right-shifting operation can be relatively time consuming, and particularly difficult to implement in a single instruction cycle.

Accordingly, there is a need for performing zero detect of a difference of binary numbers in a rapid and efficient manner.

SUMMARY OF THE INVENTION

An object of the present invention is to provide rapid and efficient zero detection of a difference of binary operands. In accordance with a preferred aspect of the invention, zero detect of a binary difference is provided by a general purpose computer in a single instruction cycle without the need for actually calculating the difference.

The present invention provides zero detect for a binary difference of a minuend and a single subtrahend, as well as zero detect of a binary difference of a minuend and multiple subtrahends. Thus, the operands may include a minuend and M subtrahends (where M is an integer of at least one). For example, with two operands A and B in which A is the minuend and B is the subtrahend, the difference is A−B. Similarly, with three operands A, B and C in which A the minuend and B and C are the subtrahends, the difference is A−B−C. The three operand case (with two subtrahends) is particularly useful for subtract with borrow operations, in which a carry-in bit to be subtracted provides the second subtrahend.

The present invention includes a method of operating a circuit to determine whether a difference of binary operands is zero. In one embodiment, the method includes the steps of providing a result representing a bit-complement of the difference, and inspecting a carry-out bit generated by incrementing the result. When the difference of the operands is zero, the bit-complement of the difference is a string of one's, and therefore incrementing the bit-complemented difference generates a carry-out bit of one. Likewise, when the difference of the operands is non-zero, the bit-complement of the difference includes one or more zero's, and incrementing the bit-complemented difference generates a carry-out bit of zero. Therefore, a zero detect flag is set to TRUE when the carry-out bit is a one, and the zero detect flag is set to FALSE when the carry-out bit is a zero. The result can be provided by calculating the difference of the operands and bit-complementing the difference. The result can also be provided by calculating the difference of the operands and decrementing the difference. The result can also be provided by bit-complementing the minuend and summing the bit-complemented minuend and the M subtrahends. If M is one, or M is two and one of the subtrahends is a carry-in bit, then the carry-out bit generated by summing the bit-complemented minuend and the M subtrahends represents a complemented carry-out bit of the difference of the minuend and the M subtrahends, and the result can be bit-complemented to provide the difference.

The present invention also includes a method of operating a circuit to determine whether a difference of binary operands is zero, including the steps of bit-complementing the minuend, generating a first carry-out bit from a sum of the bit-complemented minuend and the M subtrahends, generating a second carry-out bit from a sum of the bit-complemented minuend and the M subtrahends and a constant of one, and determining whether the first and second carry-out bits have different logical values. A zero detect flag is set to TRUE when the first and second carry-out bits have different logical values, and the zero detect flag is set to FALSE when the first and second carry-out bits have the same logical value. If M is one, or M is two and one of the subtrahends is a carry-in bit, then the first carry-out bit can be complemented to provide a carry-out bit of the difference of the operands, and the sum of the bit-complemented minuend and the subtrahends can be bit-complemented to provide the difference of the operands.

The present invention includes an apparatus for providing zero detect of a difference of binary operands, including a sum adder, first and second inverter circuits, and a carry generator in combination. The first inverter circuit bit-complements the minuend. The sum adder generates a sum of the bit-complemented minuend and the M subtrahends at a sum output. The second inverter circuit bit-complements the sum output to provide the difference of the operands. The carry generator provides a carry-out bit based on the sum output after it is incremented by one. Therefore, a zero detect flag is set to TRUE when the carry-out bit is a one, and the zero detect flag is set to FALSE when the carry-out bit is a zero.

The present invention also includes an apparatus for providing zero detect of a difference of binary operands, including an inverter circuit, first and second carry generators, and an inspection circuit in combination. The inverter circuit provides a bit-complemented version of the minuend to the carry generators, and the M subtrahends are also applied to the carry generators. The first carry generator generates a first carry-out bit based on a sum of the bit-complemented minuend and the M subtrahends. The second carry generator generates a second carry-out bit based on a sum of the bit-complemented minuend and the M subtrahends and a constant of one. The inspection circuit receives the first and second carry-out bits, sets a zero detect flag to TRUE when the first and second carry-out bits have different logical values, and sets the zero detect flag to FALSE when the first and second carry-out bits have the same logical value. In one implementation, the first and second carry generators include propagate-generate (PG) sections coupled to respective first and second carry chains in which the first carry chain has a carry-in bit set to zero and the second carry chain has a carry-in bit set to one. In this manner, zero detect can be rapidly provided without calculating the difference of the operands.

Advantageously, the present invention provides rapid and efficient zero detect of a difference of binary numbers which can be used, for instance, to set or reset a zero flag after a subtract or compare operation.

These and other objects, features and advantages of the invention will be further described and more readily apparent from a review of the detailed description of the preferred embodiments which follow.

BRIEF DESCRIPTION OF THE DRAWINGS

In the drawings, which are not necessarily drawn to scale, in which like reference numerals indicate like parts.

DETAILED DESCRIPTION OF THE PREFERRED EMBODIMENTS

Figure 1:
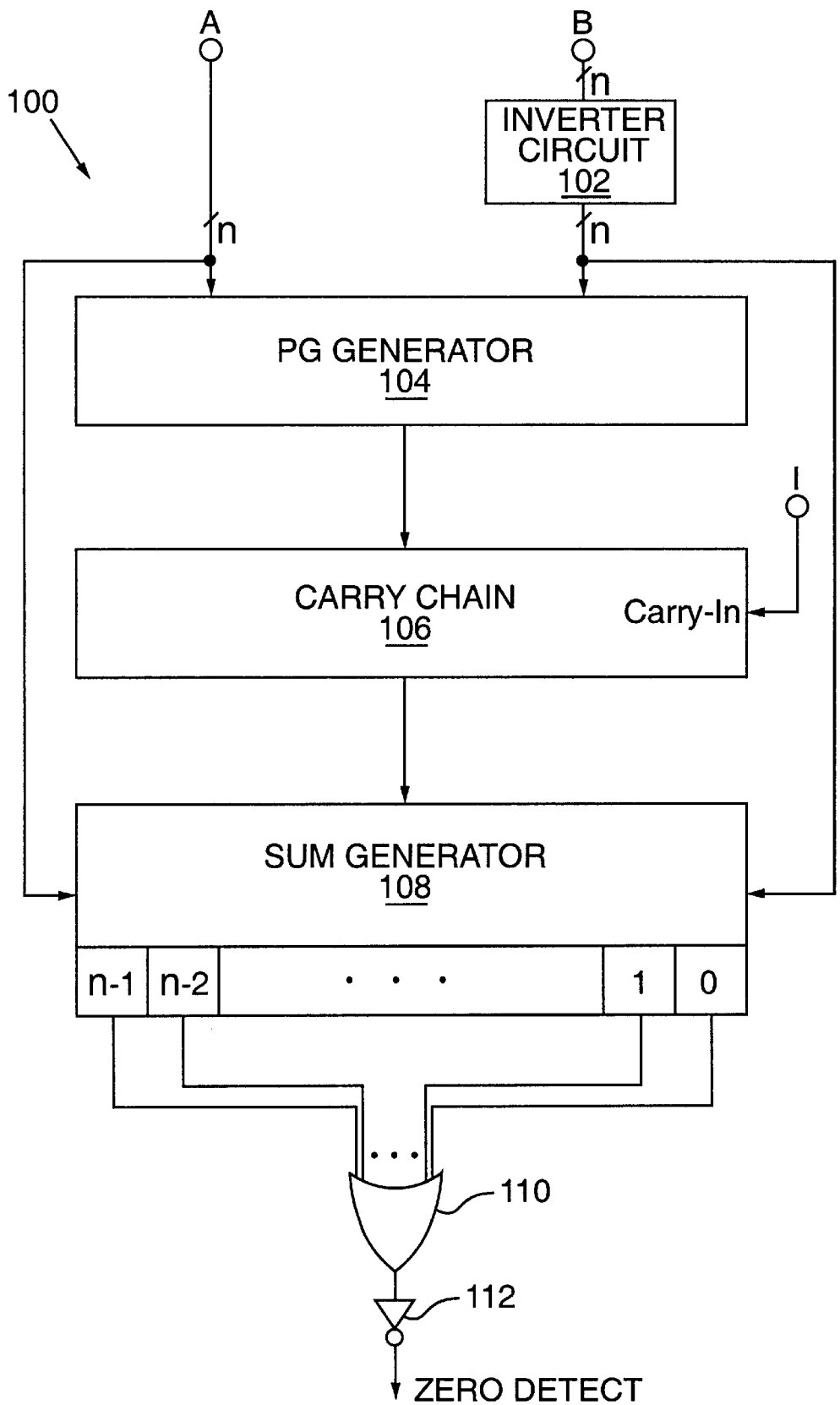
FIG. 1 is a block diagram of a known zero detection circuit for a binary difference.

Zero detection of a difference of binary operands can be accomplished by providing a result representing a bit-complement of the difference, and inspecting a carry-out bit generated by incrementing the result. The carry-out bit is a one when the result is a string of one's, otherwise the carry-out bit is a zero. Furthermore, the result is a string of one's only if the difference of the binary operands is a string of zero's. Therefore, the carry-out bit generated by incrementing the result is a one only if the difference of the operands is zero. Accordingly, a zero detect flag can be set to TRUE when the carry-out bit is a one, and set to FALSE when the carry-out bit is a zero.

Zero detection of a difference of binary operands can also be accomplished by generating a first carry-out bit of a first result representing a bit-complement of the difference, generating a second carry-out bit of a second result representing a bit-complement of the difference incremented by one, and determining whether the first carry-out bit and the second carry-out bit have different logical values (i.e., 01 or 10) or the same logical value (i.e., 00 or 11). The first and second carry-out bits will have different logical values when the first result is a string of one's and the second result is a string of zero's. Accordingly, a zero detect flag can be set to TRUE when the EXCLUSIVE-OR of the first carry-out bit and the second carry-out bit is a one, and otherwise set to FALSE.

Preferably, the binary operands are n-bit operands (treating a 1-bit carry-in operand as an n-bit operand with n-1 leading zero's), the difference between the binary operands is an n-bit number, and the carry-out bits are from the most significant bit (MSB) position of an associated n-bit sum or result. If desired, the binary operands can be portions of larger operands. Furthermore, the binary operands can either be signed or unsigned, with signed operands represented in 1's complement or 2's complement form. Finally, it is understood that when M subtrahends are specified, M is an integer of at least one.

The present invention is perhaps best understood by considering some of the underlying mathematics. Consider zero detect for a difference of two n-bit binary operands A and B. If A−B is equal to zero, then the difference is an n-bit string of zero's, and the bit-complement of A−B, or $\overline{A-B}$, is an n-bit string of one's. Incrementing an n-bit string of one's produces an n-bit string of zero's and a carry-out bit of one from the most significant bit position. Likewise, incrementing an n-bit string which contains any zero's generates a carry-out bit of zero from the most significant bit position. Therefore, a zero binary difference can be detected by incrementing $\overline{A-B}$ and inspecting the carry-out bit for the most significant bit position of the n-bit incremented result. This can be accomplished, for instance, by subtracting B from A to obtain a result, discarding the carry-out bit from the result, bit-complementing the result, incrementing the bit-complemented result, and inspecting the carry-out bit generated by the incrementing. A disadvantage to this approach, however, is that the zero detect is delayed by the subtract then increment sequence. The present invention also provides for a more rapid approach for zero detect. Consider the following algebraic manipulations (using 2's complement form):

$$\overline{A-B} = -(A-B) - 1 \qquad (1)$$

$$\overline{A-B} = -A + B - 1 \qquad (2)$$

$$\overline{A-B} = (\bar{A} + 1) + B - 1 \qquad (3)$$

$$\overline{A-B} = \bar{A} + B \qquad (4)$$

In accordance with expression (4), zero detect for the difference of A and B can be determined by inspecting the carry-out bit generated by incrementing $\bar{A}+B$. Likewise, zero detect for the difference of A and B can be determined by inspecting the EXCLUSIVE-OR of the carry-out bit for $\bar{A}+B$ and the carry-out bit for $\bar{A}+B+1$. Furthermore, by appropriate use of a PG generator and carry chains, the carry-out bits for $\bar{A}+B$ and for $\bar{A}+B+1$ can be determined concurrently without actually summing the numbers, thereby eliminating the need for sum generators and providing a rapid zero detect operation.

If a binary result is bit-complemented, then the carry-out bit is also complemented. Therefore, the bit-complement of A−B, or $\overline{A-B}$, generates a carry-out bit corresponding to a complemented carry-out bit of A−B. Thus, in accordance with expression (4), carry detect for A−B occurs when $\bar{A}+B$ generates a carry-out bit set to zero. Furthermore, by appropriate use of a PG generator and carry chains, the carry-out bit for $\bar{A}+B$ can be determined without actually summing the numbers, so that the sum generator can be eliminated. This provides for a rapid carry detect operation.

Consider zero detect for a difference of an n-bit binary operand A (minuend) and two n-bit binary operands and B and C (subtrahends). If A−B−C is equal to zero, then the difference (between A and B+C) is an n-bit string of zero's and the bit-complement of A−B−C, or $\overline{A-B-C}$, is an n-bit string of one's. Therefore, a zero binary difference can be detected by incrementing $\overline{A-B-C}$ and inspecting the carry-out bit for the most significant bit position of the n-bit incremented result. This can be accomplished, for instance, by subtracting B and C from A to obtain a result, discarding the carry-out bit from the result, bit-complementing the result, incrementing the bit-complemented result, and inspecting the carry-out bit generated by the incrementing. As with the two operand case, zero detect is delayed by the subtract then increment sequence. Consider the following algebraic manipulations (using 2's complement form):

$$\overline{A-B-C} = -(A-B-C) - 1 \qquad (5)$$

$$\overline{A-B-C} = -A + B + C - 1 \qquad (6)$$

$$\overline{A-B-C} = (\bar{A} + 1) + B + C - 1 \qquad (7)$$

$$\overline{A-B-C} = \bar{A} + B + C \qquad (8)$$

In accordance with expression (8), zero detect for the difference of A and B+C can be determined by inspecting the carry-out bit generated by incrementing $\bar{A}+B+C$. Likewise, zero detect for the difference of A and B+C can be determined by inspecting the EXCLUSIVE-OR of the carry-out bit for $\bar{A}+B+C$ and the carry-out bit for $\bar{A}+B+C+1$. Furthermore, by appropriate use of a PG generator and carry chains, the carry-out bits for $\bar{A}+B+C$ and for $\bar{A}+B+C+1$ can be determined concurrently without actually summing the numbers. Since only the carry-out bits are needed, the sum generators can be eliminated. This also provides for a rapid zero detect and carry detect operation.

Consider the case of zero detect for operands A, B and C, where C is a 1-bit carry-in bit. In accordance with expression (8), the first carry-out bit is generated by the sum $\bar{A}+B+C$, and the second carry-out bit is generated by the sum $\bar{A}+B+C+1$. When C is a zero, the first carry-out bit can be provided as follows:

$$\bar{A}+B+C = \bar{A}+B+0 \qquad (9)$$

$$\bar{A}+B+C = \bar{A}+B \qquad (10)$$

Likewise, when C is zero, the second carry-out bit can be provided as follows:

$$\bar{A}+B+C+1 = \bar{A}+B+0+1 \qquad (11)$$

$$\bar{A}+B+C+1 = \bar{A}+B+1 \qquad (12)$$

Thus, when C is a zero, this is equivalent to the two operand case, in which the first carry-out bit is generated by the sum $\bar{A}+B$, and the second carry-out bit is generated by the sum $\bar{A}+B+1$. When, however, C is a one, the first carry-out bit can be provided as follows:

$$\bar{A}+B+C = \bar{A}+B+1 \qquad (13)$$

Likewise, when C is a one, the second carry-out bit can be provided as follows:

$$\bar{A}+B+C+1 = \bar{A}+B+1+1 \qquad (14)$$

$$\bar{A}+B+C+1 = \bar{A}+B+2 \qquad (15)$$

Thus, when C is a one, the first carry-out bit is generated by the sum $\bar{A}+B+1$, and the second carry-out bit is generated by the sum $\bar{A}+B+2$.

When the difference of the operands is zero, in some instances the first carry-out bit will be a zero and the second carry-out bit will be a one, although in other instances the first carry-out bit will be a one and the second carry-out bit will be a zero. Consider the case of unsigned n-bit binary integers. If the minuend is equal to the sum of the subtrahends, then adding the bit-complement of the minuend to the sum of the subtrahends generates an n-bit string of one's with a carry-out bit of zero, and adding the bit-complement of the minuend to the sum of the subtrahends plus one generates an n-bit string of zero's with a carry-out bit of one. Therefore, zero detect is provided by determining when the first carry-out bit is a zero and the second carry-out bit is a one. Consider the case of two n-bit signed binary operands A and B represented in 2's complement form, where A is the minuend, B is the subtrahend, and A is equal to B. The sum of $\overline{A}$+B generates an n-bit string of one's with a carry-out bit of zero since each bit position of the sum is provided by adding a zero to a one, and the sum of $\overline{A}$+B+1 generates an n-bit string of zero's with a carry-out bit of one. Therefore, zero detect is provided by determining when the first carry-out bit is a zero and the second carry-out bit is a one. Consider now the case of three n-bit signed binary operands A and B and C represented in 2's complement form, where A is the minuend, B and C are the subtrahends, and A is equal to B+C (for n>1 and C>1). If, for instance, A is zero, B is one and C is negative one, then the sum of $\overline{A}$+B+C generates an n-bit string of one's and a carry-out bit of one, and the sum $\overline{A}$+B+C+1 generates an n-bit string of zero's with a carry-out bit of zero from the MSB position of the sum and another carry-out bit of one from the MSB+1 position of the sum. Thus, the first carry-out bit is one, the second carry-out bit is zero, and the carry-out bit from the MSB+1 position is discarded.

In all cases where the n-bit difference of the n-bit minuend and M n-bit subtrahends is zero, the first and second carry-out bits have different logical values. Furthermore, when the difference of the minuend and M subtrahends is non-zero, the n-bit sum of the bit-complemented minuend plus the M subtrahends contains at least one zero, the n-bit sum of the bit-complemented minuend plus the M subtrahends plus one is equivalent to adding one to an n-bit string with at least one zero, which does not change the carry-out bit from the MSB position, and therefore the first and second carry-out bits have the same logical value. Accordingly, the EXCLUSIVE-OR of the first and second carry-out bits provides zero detect of the binary difference.

Based on the foregoing, it is proposed that zero detect for the difference of a minuend and M subtrahends can be provided by determining whether the carry-out bit generated by incrementing the sum of the bit-complemented minuend and the M subtrahends is a one. Likewise, zero detect can be provided by determining whether the EXCLUSIVE-OR of the carry-out bit for the sum of the bit-complemented minuend and the M subtrahends, and the carry-out bit for the sum of the bit-complemented minuend and the M subtrahends and a constant of one, is a one.

It should also be noted that when the difference is between an n-bit minuend and a single n-bit subtrahend, or an n-bit minuend and two subtrahends in which one subtrahend is n-bit and the other subtrahend is a single bit, then the bit-complement of the n-bit sum of the bit-complemented minuend plus the subtrahend (or subtrahends) provides the difference between the minuend and subtrahend (or subtrahends), and the complement of the carry-out bit generated by the n-bit sum provides the carry-out bit for the difference (for n>1). When, however, two or more n-bit subtrahends are used, then adding the bit-complemented n-bit minuend to the n-bit subtrahends might generate a carry-out bit beyond the MSB position of the n-bit sum, and therefore the bit-complement of the n-bit sum cannot be relied upon to provide the difference, and the complement of the carry-out bit from the MSB position of the n-bit sum can not be relied upon to provide the carry-out bit for the difference.

Figure 2:
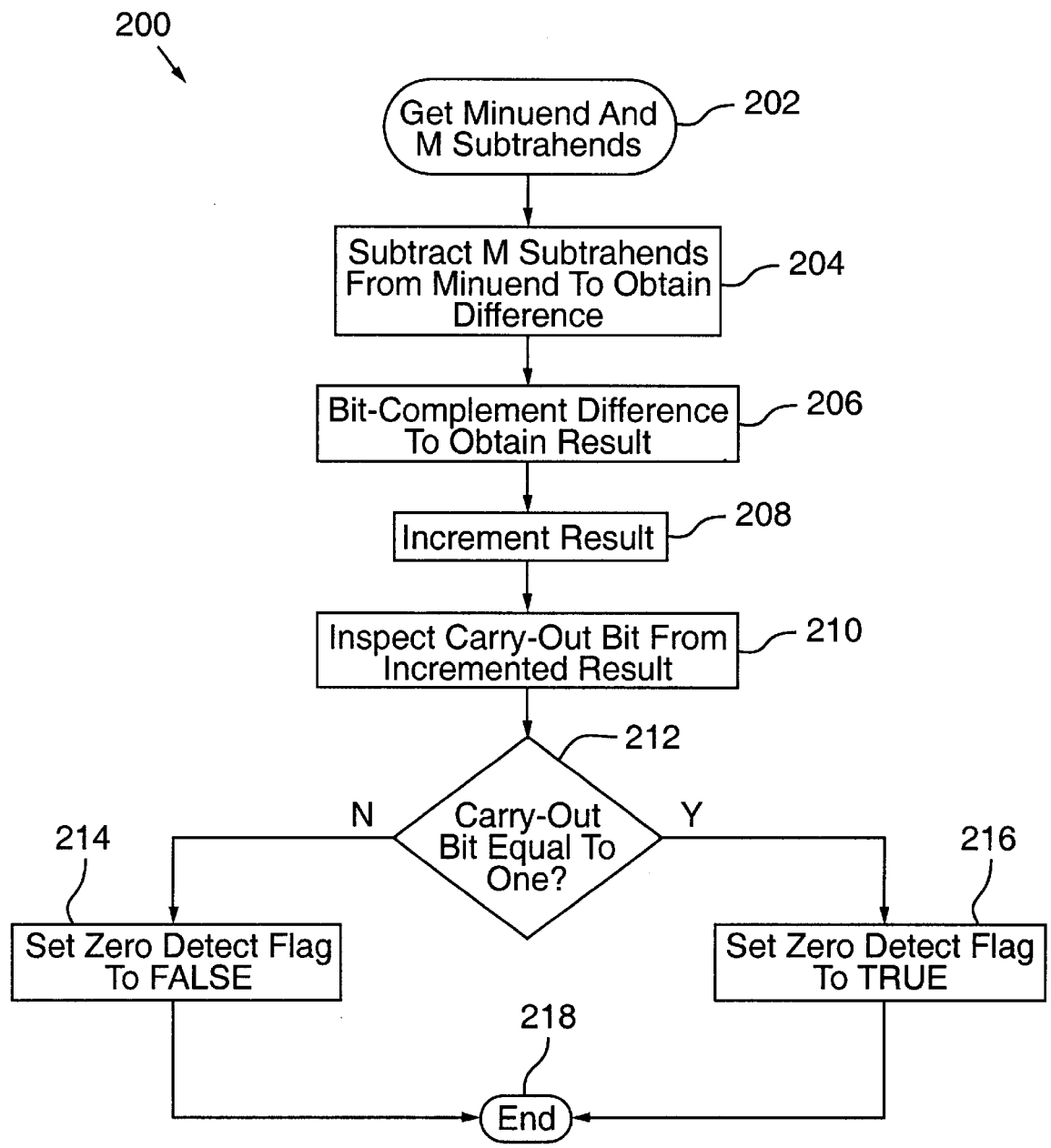
FIGS. 2 through 12 are flow charts of algorithms used to perform zero detect of a binary difference in accordance with embodiments of the invention.

FIG. 2 is a flow chart of algorithm 200 in accordance with one aspect of the invention. At step 202, binary operands consisting of a minuend and M subtrahends are obtained. At step 204, the subtrahends are subtracted from the minuend to obtain a difference and the carry-out bit is discarded. At step 206, the difference between the minuend and the subtrahends is bit-complemented to obtain a result. At step 208, the result is incremented. At step 210, the carry-out bit from the incremented result is inspected. If the carry-out bit from the incremented result is a one, decision step 212 branches to step 216 where the zero detect flag is set to TRUE and the algorithm terminates at step 218. If the carry-out bit from the incremented result is a zero, decision step 212 branches to step 214 where the zero detect flag is set to FALSE and the algorithm terminates at step 218.

Figure 3:
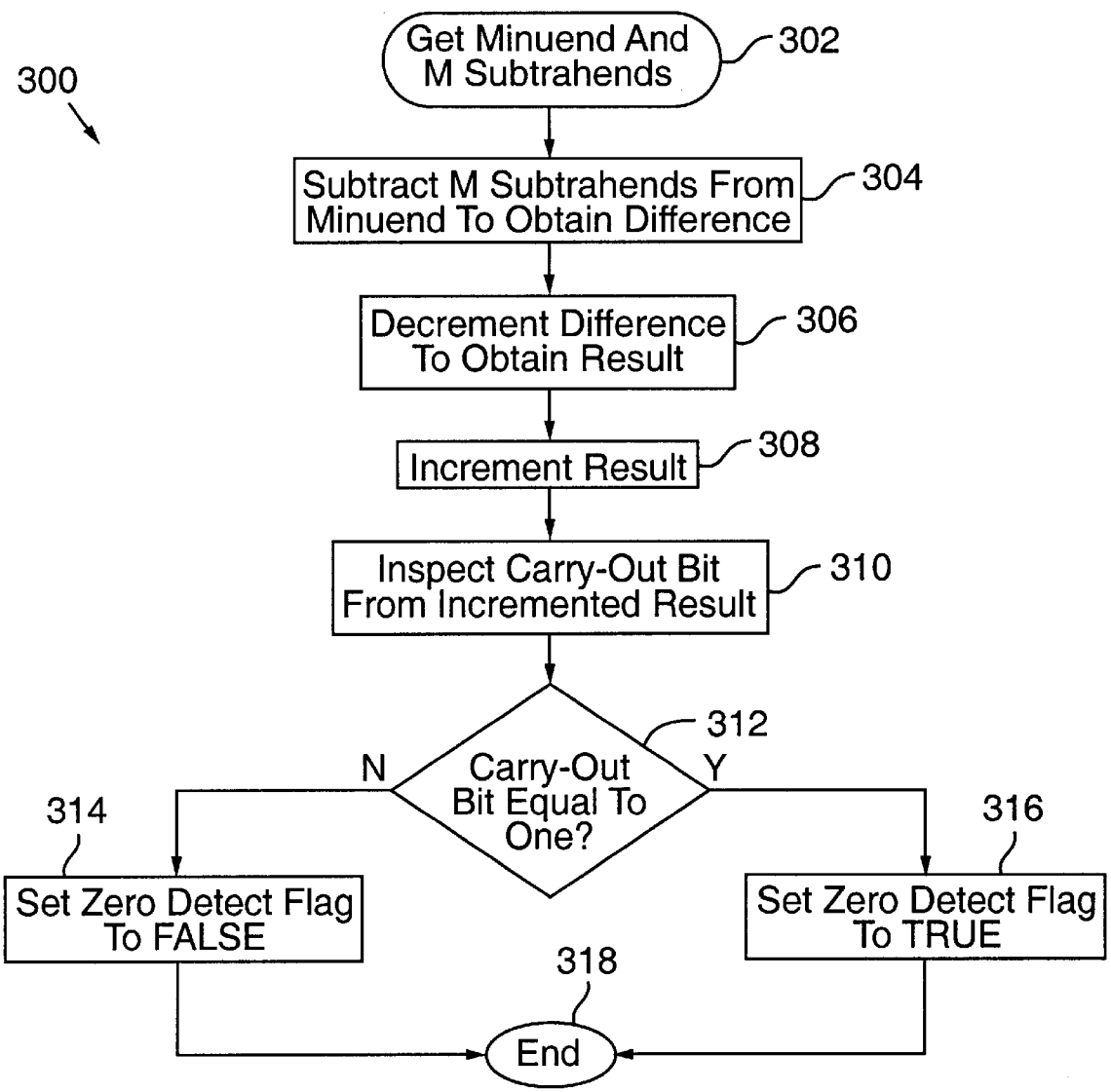

FIG. 3 is a flow chart of algorithm 300 in accordance with another aspect of the invention. At step 302, binary operands consisting of a minuend and M subtrahends are obtained. At step 304, the subtrahends are subtracted from the minuend to obtain a difference and the carry-out bit is discarded. At step 306, the difference between the minuend and the M subtrahends is decremented to obtain a result. At step 308, the result is incremented. At step 310, a carry-out bit from the incremented result is inspected. If the carry-out bit from the incremented result is a one, decision step 312 branches to step 316 where the zero detect flag is set to TRUE and the algorithm terminates at step 318. If the carry-out bit from the incremented result is a zero, decision step 312 branches to step 314 where the zero detect flag is set to FALSE and the algorithm terminates at step 318.

Figure 4:
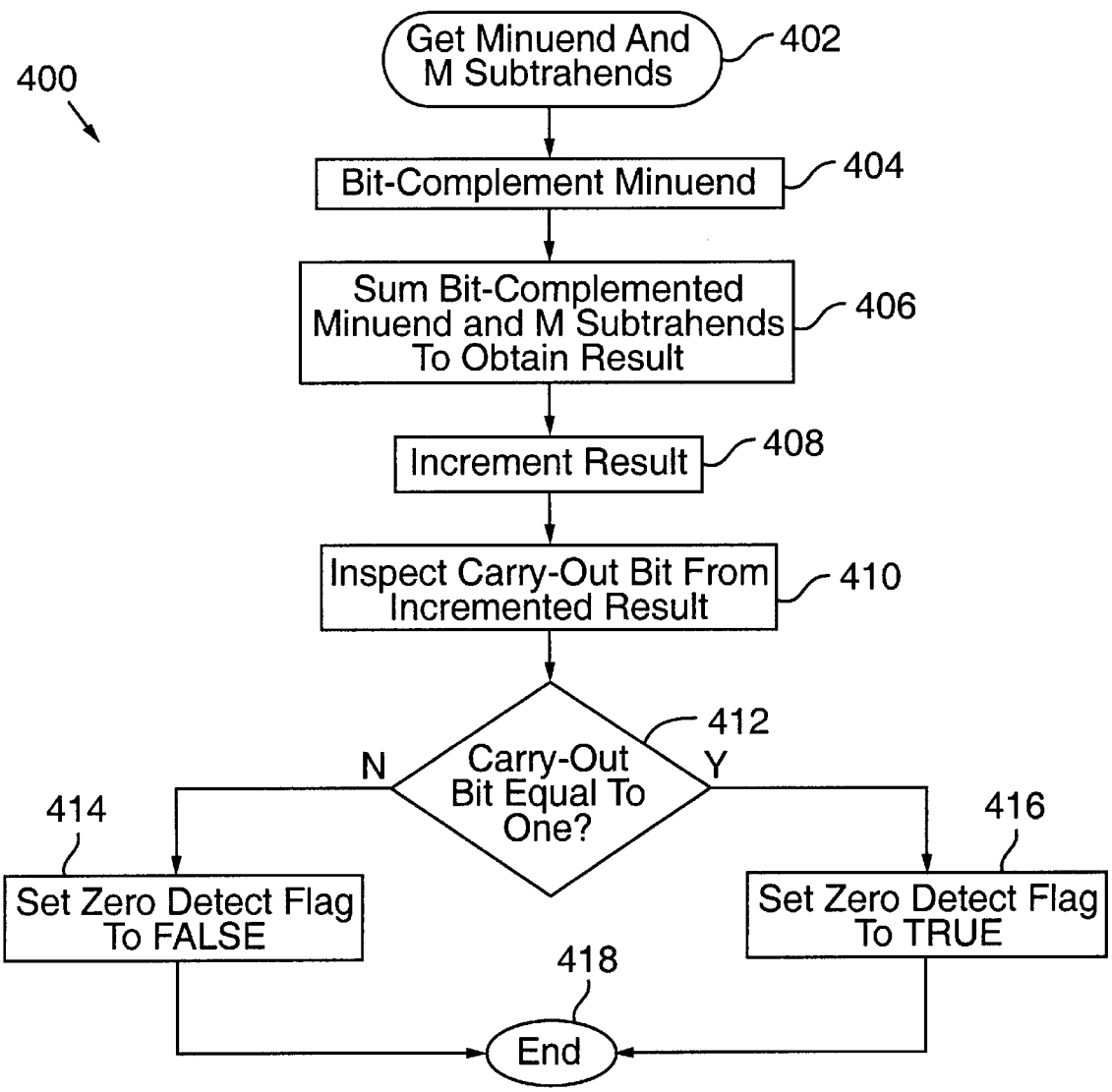

FIG. 4 is a flow chart of algorithm 400 in accordance with another aspect of the invention. At step 402, binary operands consisting of a minuend and M subtrahends are obtained. At step 404, the minuend is bit-complemented. At step 406, the bit-complemented minuend and the M subtrahends are summed to obtain a result, and the carry-out bit is discarded. At step 408, the result is incremented. At step 410, a carry-out bit from the incremented result is inspected. If the carry-out bit of the incremented result is a one, decision step 412 branches to step 416 where the zero detect flag is set to TRUE and the algorithm terminates at step 418. If the carry-out bit of the incremented result is a zero, decision step 412 branches to step 414 where the zero detect flag is set to FALSE and the algorithm terminates at step 418.

Figure 5:
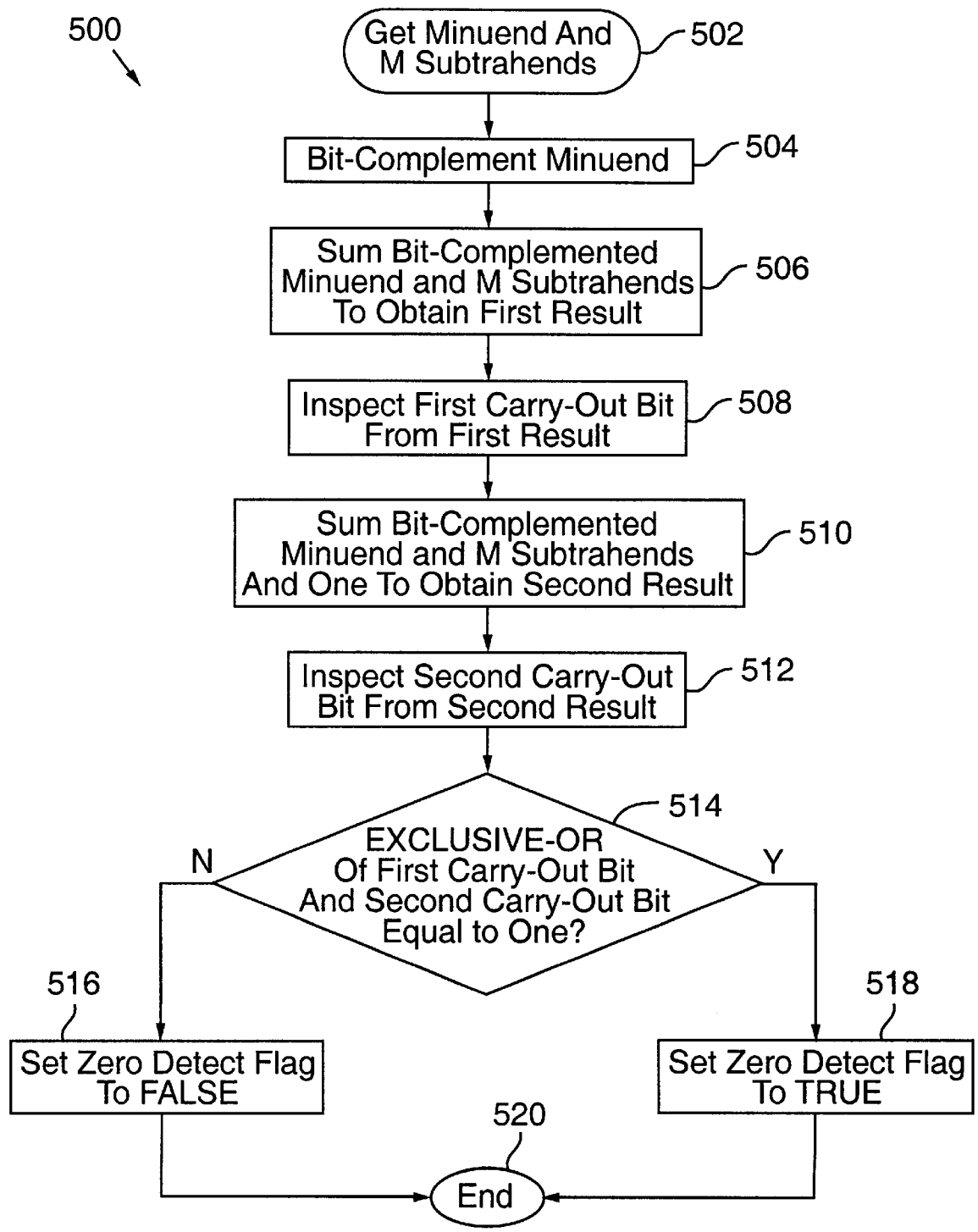

FIG. 5 is a flow chart of algorithm 500 in accordance with another aspect of the invention. At step 502, binary operands consisting of a minuend and M subtrahends are obtained. At step 504, the minuend is bit-complemented. At step 506, the bit-complemented minuend and the M subtrahends are summed to obtain a first result. At step 508, a first carry-out bit from the first result is inspected. At step 510, the bit-complemented minuend and the M subtrahends and a constant of one are summed to obtain a second result. At step 512, a second carry-out bit from the second result is inspected. If the EXCLUSIVE-OR of the first carry-out bit and the second carry-out bit is a one, decision step 514 branches to step 518 where the zero detect flag is set to TRUE and the algorithm terminates at step 520. If the EXCLUSIVE-OR of the first carry-out bit and the second carry-out bit is a zero, decision step 514 branches to step 516 where the zero detect flag is set to FALSE and the algorithm terminates at step 520.

Figure 6:
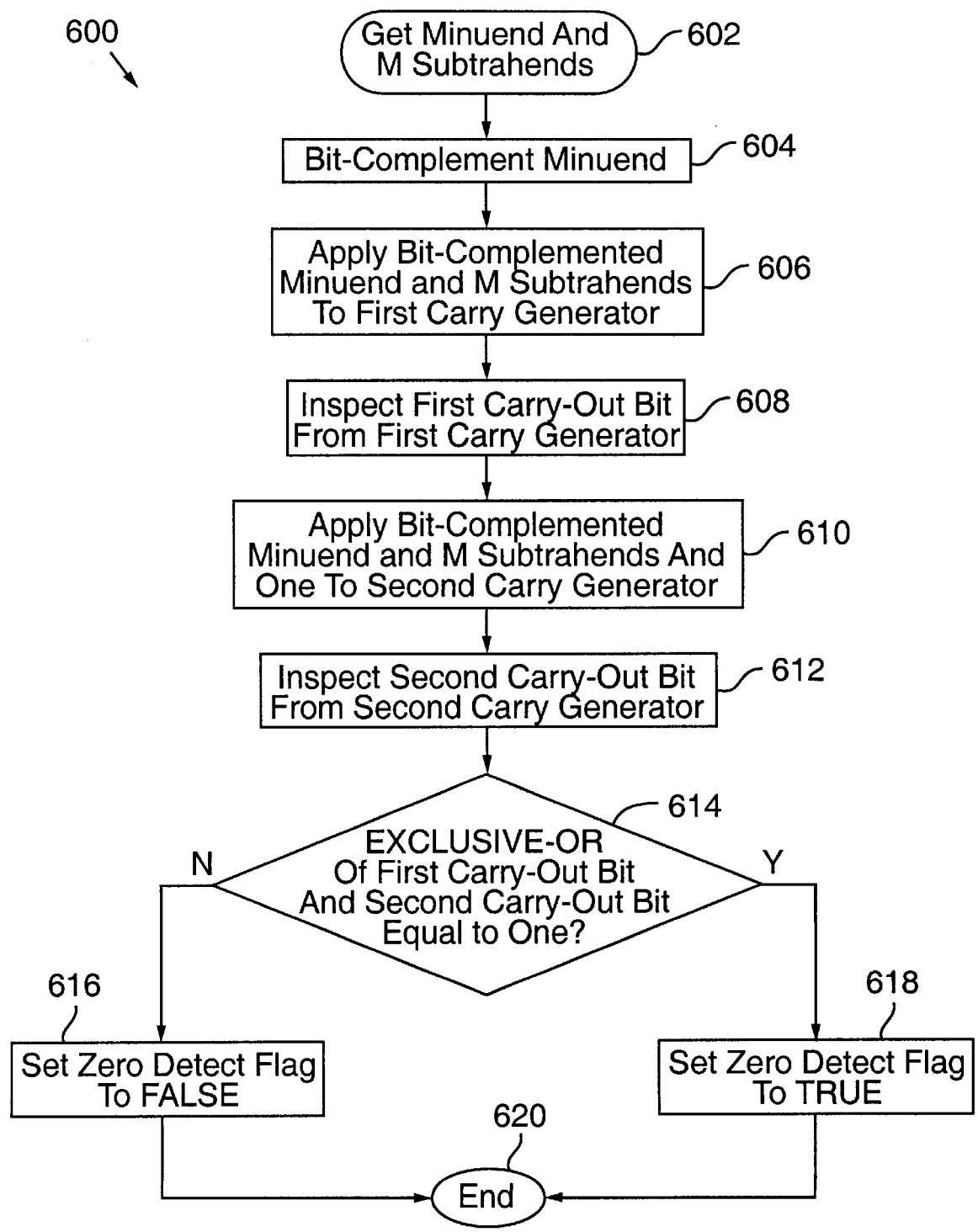

FIG. 6 is a flow chart of algorithm 600 in accordance with another aspect of the invention. At step 602, binary operands consisting of a minuend and M subtrahends are obtained. At step 604, the minuend is bit-complemented. At step 606, the bit-complemented minuend and the M subtrahends are applied to a first carry generator. The first carry generator generates a first carry-out bit of a sum of the bit-complemented minuend and M subtrahends without actually calculating the sum. At step 608, the first carry-out bit from the first carry generator is inspected. At step 610, the bit-complemented minuend and the M subtrahends and a constant of one are applied to a second carry generator. The second carry generator generates a second carry-out bit of a sum of the bit-complemented minuend and the M subtrahends and the constant of one without actually calculating the sum. At step 612, the second carry-out bit from the second carry generator is inspected. If the EXCLUSIVE-OR of the first carry-out bit and the second carry-out bit is a one, decision step 614 branches to step 618 where the zero detect flag is set to TRUE and the algorithm terminates at step 620. If the EXCLUSIVE-OR of the first carry-out bit and the second carry-out bit is a zero, decision step 614 branches to step 616 where the zero detect flag is set to FALSE and the algorithm terminates at step 620.

Figure 7:
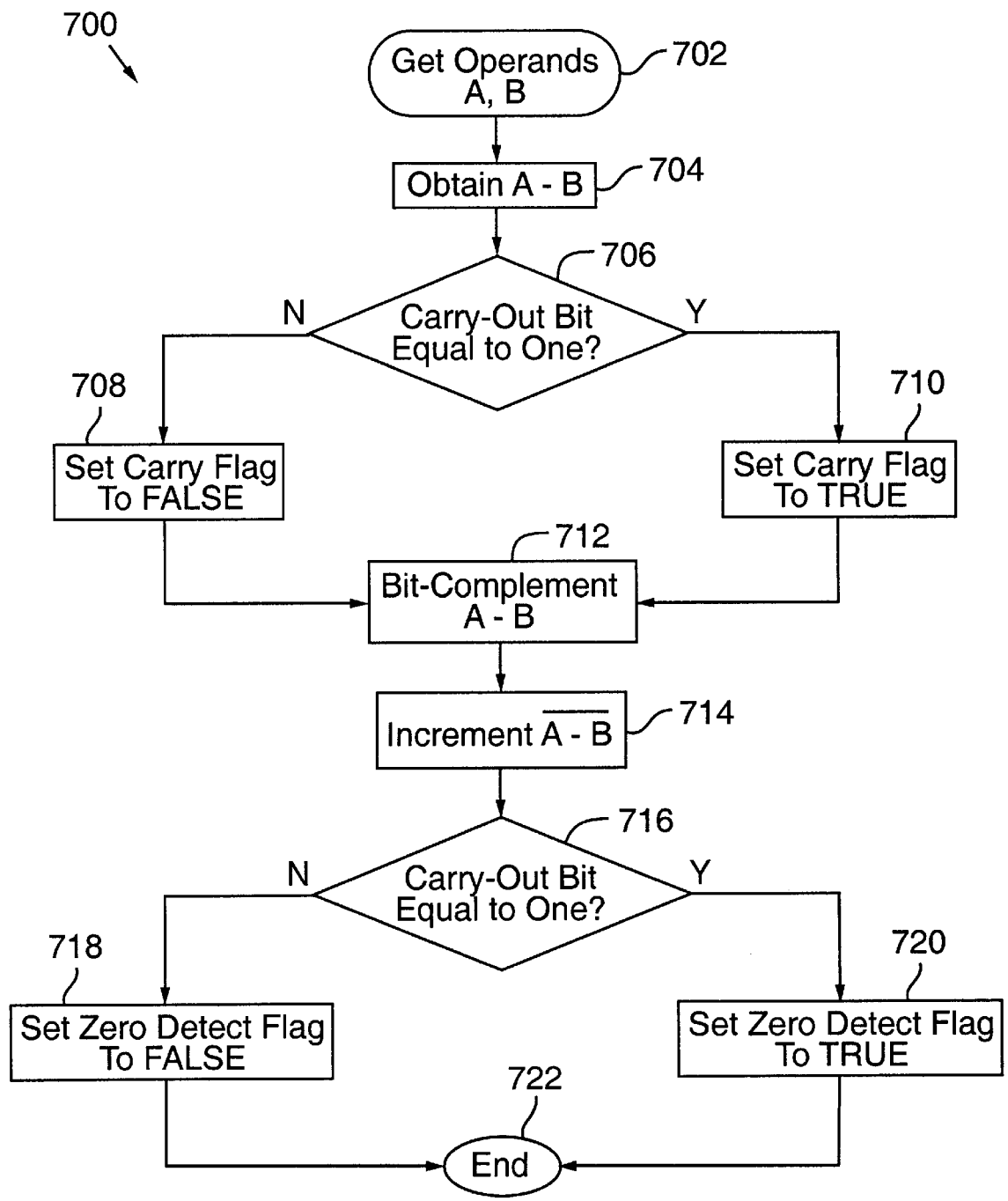

FIG. 7 is a flow chart of algorithm 700 in accordance with another aspect of the invention. Algorithm 700 provides an example of algorithm 200 using two operands. At step 702, binary operands A and B are obtained. At step 704, the difference A−B is calculated. At decision step 706, if the carry-out bit of the difference A−B is a one then at step 710 the carry flag is set to TRUE and the algorithm proceeds to step 712, whereas if the carry-out bit is a zero then at step 708 the carry flag is set to FALSE and the algorithm proceeds to step 712. Thereafter, the carry-out bit of the difference A−B is discarded. At step 712, the difference A−B is bit-complemented to obtain $\overline{A-B}$, and at step 714 the bit-complemented difference is incremented to provide ($\overline{A-B}$)+1. Step 716 tests whether the carry-out bit of ($\overline{A-B}$)+1 is equal to one. If so, at step 720 the zero detect flag is set to TRUE and the algorithm terminates at step 722, otherwise at step 718 the zero detect flag is set to FALSE and the algorithm terminates at step 722.

Figure 8:
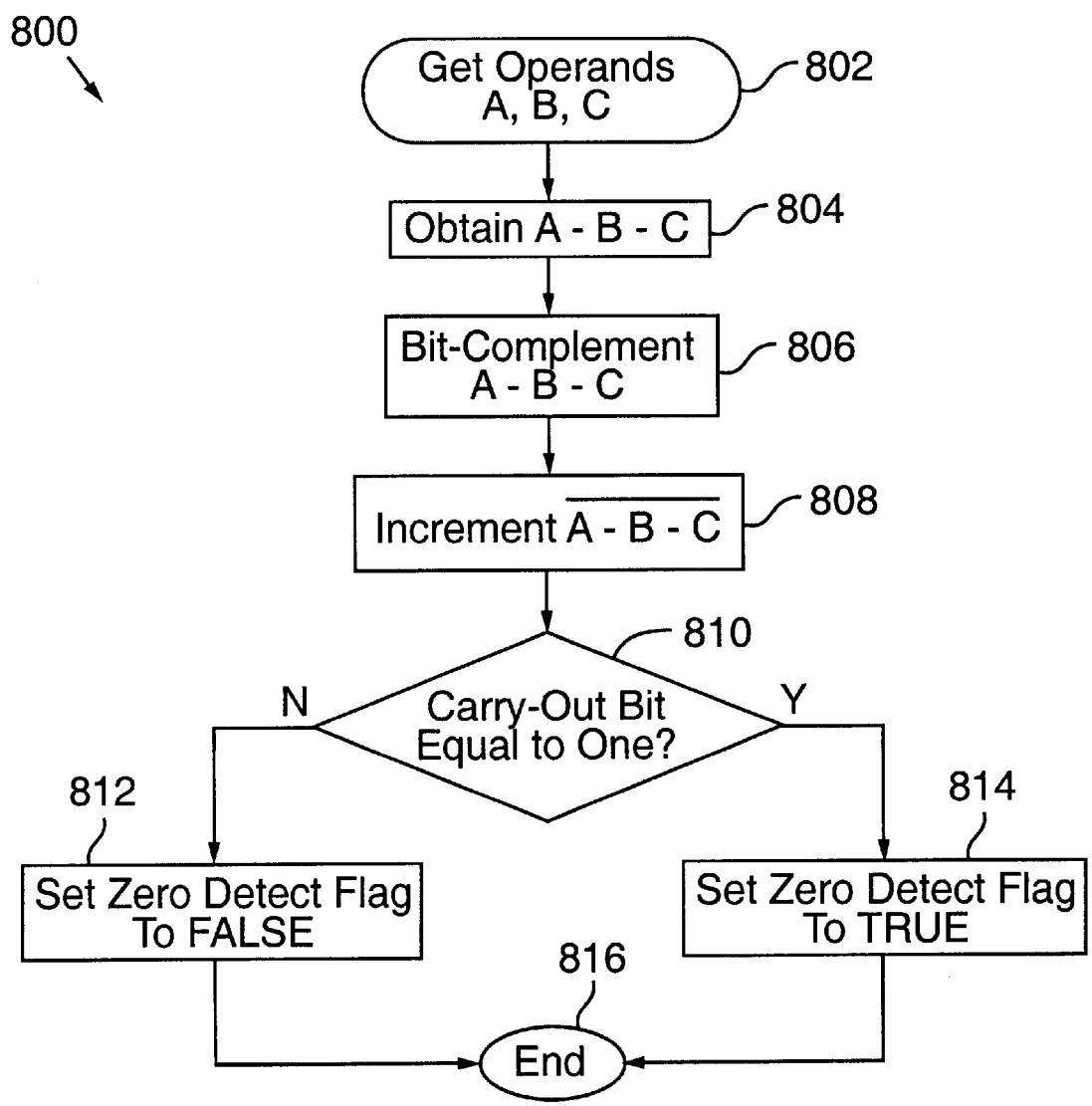

FIG. 8 is a flow chart of algorithm 800 in accordance with another aspect of the invention. Algorithm 800 provides an example of algorithm 200 using three operands. At step 802, binary operands A, B and C are obtained. At step 804, the difference A−B−C is calculated and the carry-out bit (or bits) of the difference A−B−C is discarded. At step 806, the difference A−B−C is bit-complemented to obtain $\overline{A-B-C}$, and at step 808 the bit-complemented difference is incremented to provide ($\overline{A-B-C}$)+1. Step 810 tests whether the carry-out bit of ($\overline{A-B-C}$)+1 is equal to one. If so, at step 814 the zero detect flag is set to TRUE and the algorithm terminates at step 816, otherwise at step 812 the zero detect flag is set to FALSE and the algorithm terminates at step 816.

Figure 9:
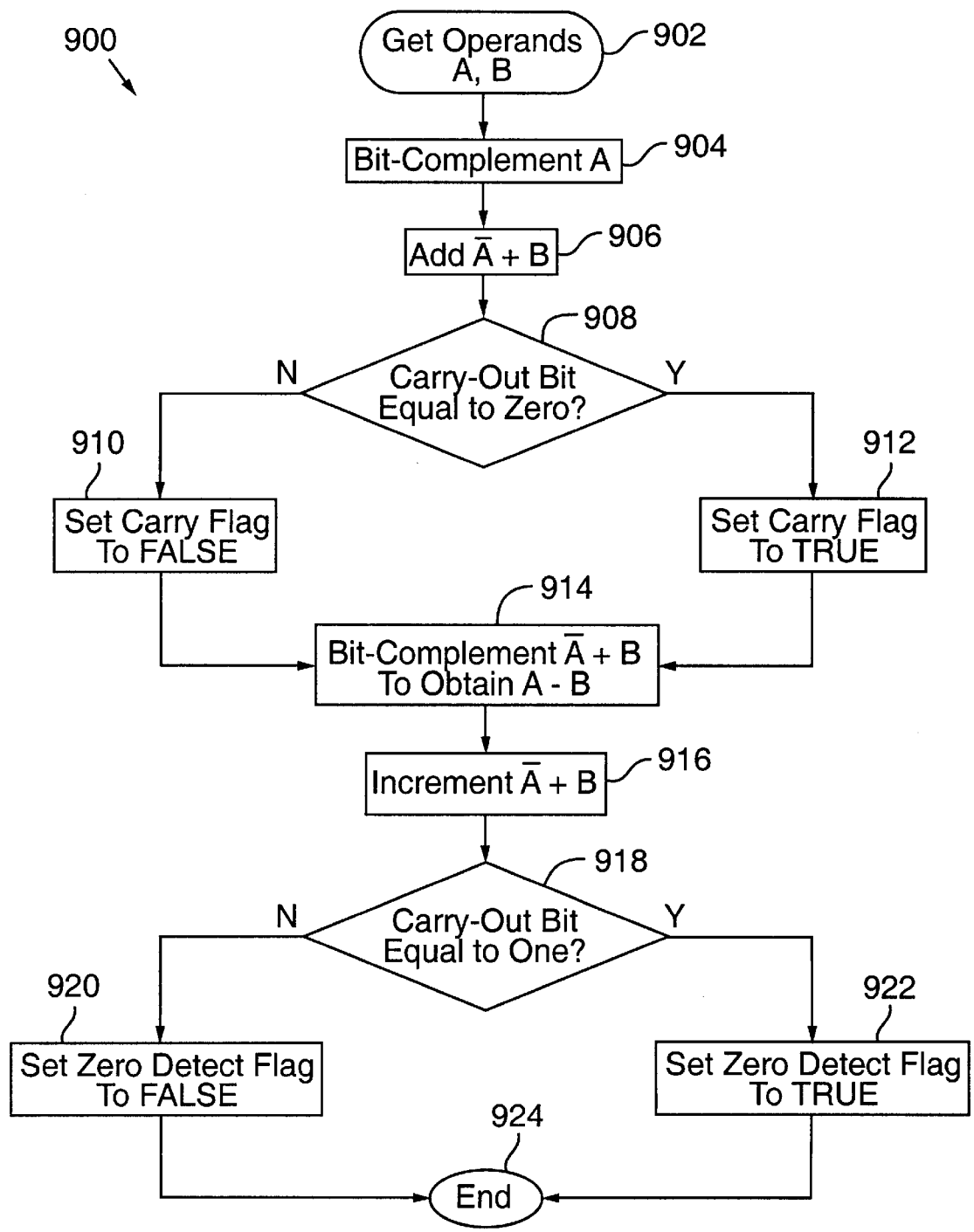

FIG. 9 is a flow chart of algorithm 900 in accordance with another aspect of the invention. Algorithm 900 provides an example of algorithm 400 using two operands. At step 902, binary operands A and B are obtained. At step 904 the A operand is bit-complemented to obtain $\overline{A}$. At step 906, $\overline{A}$ and B are added. Decision step 908 then tests whether the carry-out bit from the sum $\overline{A}$+B is a zero. If so, the carry flag is set to TRUE at step 912 and the algorithm proceeds to step 914. If not, the carry flag is set to FALSE at step 910 and the algorithm proceeds to step 914. Thereafter, the carry-out bit of the sum $\overline{A}$+B is discarded. At step 914, the sum $\overline{A}$+B is bit-complemented to obtain the difference of A−B. At step 916, the sum $\overline{A}$+B is incremented to provide ($\overline{A}$+B)+1. Decision step 918 then tests whether the carry-out bit of ($\overline{A}$+B)+1 is a one. If so, the zero detect flag is set to TRUE at step 922 and the algorithm ends at step 924, otherwise the zero detect flag is set to FALSE at step 920 and the algorithm ends at step 924.

Figure 10:
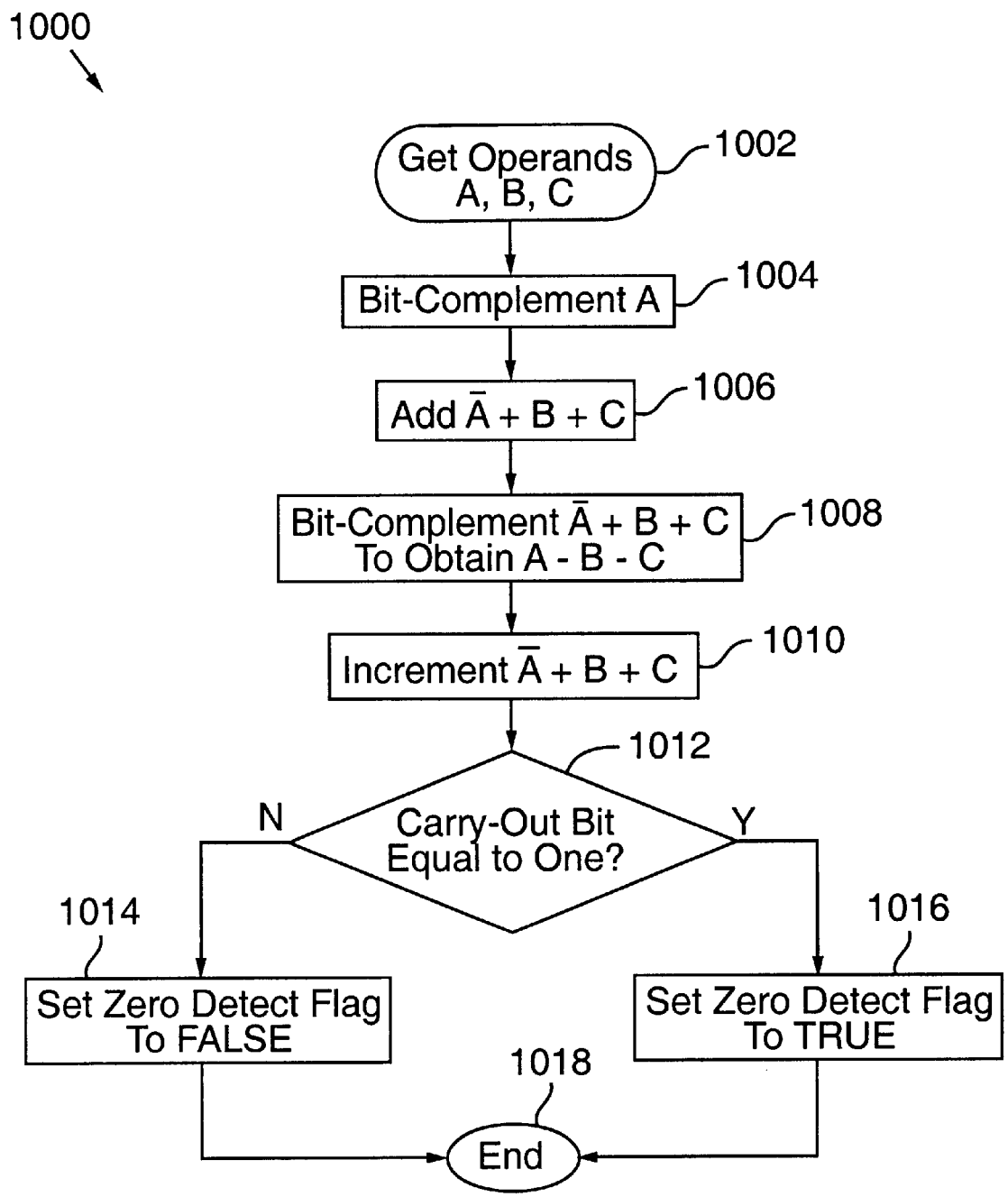

FIG. 10 is a flow chart of algorithm 1000 in accordance with another aspect of the invention. Algorithm 1000 provides an example of algorithm 400 using three operands. At step 1002, binary operands A and B and C are obtained. At step 1004 the A operand is bit-complemented to obtain $\overline{A}$. At step 1006, $\overline{A}$ and B and C are added and the carry-out bit (or bits) of the sum $\overline{A}$+B+C is discarded. At step 1008, the sum $\overline{A}$+B+C is bit-complemented to obtain the difference of A−B−C. At step 1010, the sum $\overline{A}$+B+C is incremented to provide ($\overline{A}$+B+C)+1. Decision step 1012 then tests whether the carry-out bit of ($\overline{A}$+B+C)+1 is a one. If so, the zero detect flag is set to TRUE at step 1016 and the algorithm ends at step 1018, otherwise the zero detect flag is set to FALSE at step 1014 and the algorithm ends at step 1018.

Figure 11:
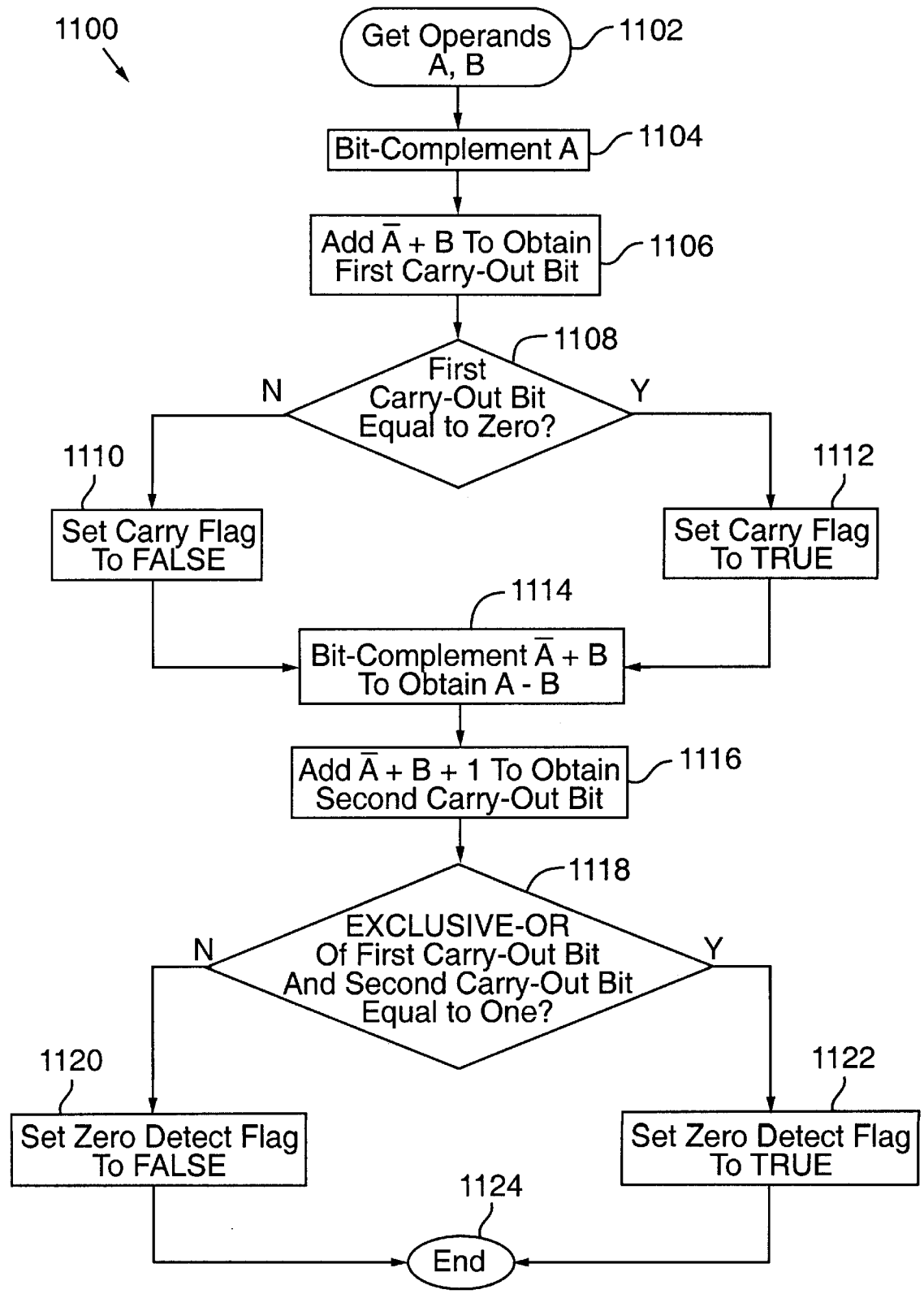

FIG. 11 is a flow chart of algorithm 1100 in accordance with another aspect of the invention. Algorithm 1100 provides an example of algorithm 500 using two operands. At step 1102, binary operands A and B are obtained. At step 1104 the A operand is bit-complemented to obtain $\overline{A}$. At step 1106, $\overline{A}$ and B are added to obtain a first carry-out bit. Decision step 1108 then tests whether the first carry-out bit of the sum $\overline{A}$+B is a zero. If so, the carry flag is set to TRUE at step 1112 and the algorithm proceeds to step 1114. If not, the carry flag is set to FALSE at step 1110 and the algorithm proceeds to step 1114. At step 1114, the sum $\overline{A}$+B is bit-complemented to obtain the difference of A−B. At step 1116, $\overline{A}$ and B and one are added to obtain a second carry-out bit. Decision step 1118 then tests whether the EXCLUSIVE-OR of the first carry-out bit from $\overline{A}$+B and the second carry-out bit from $\overline{A}$+B+1 is a one. If so, the zero detect flag is set to TRUE at step 1122 and the algorithm ends at step 1124, otherwise the zero detect flag is set to FALSE at step 1120 and the algorithm ends at step 1124.

Figure 12:
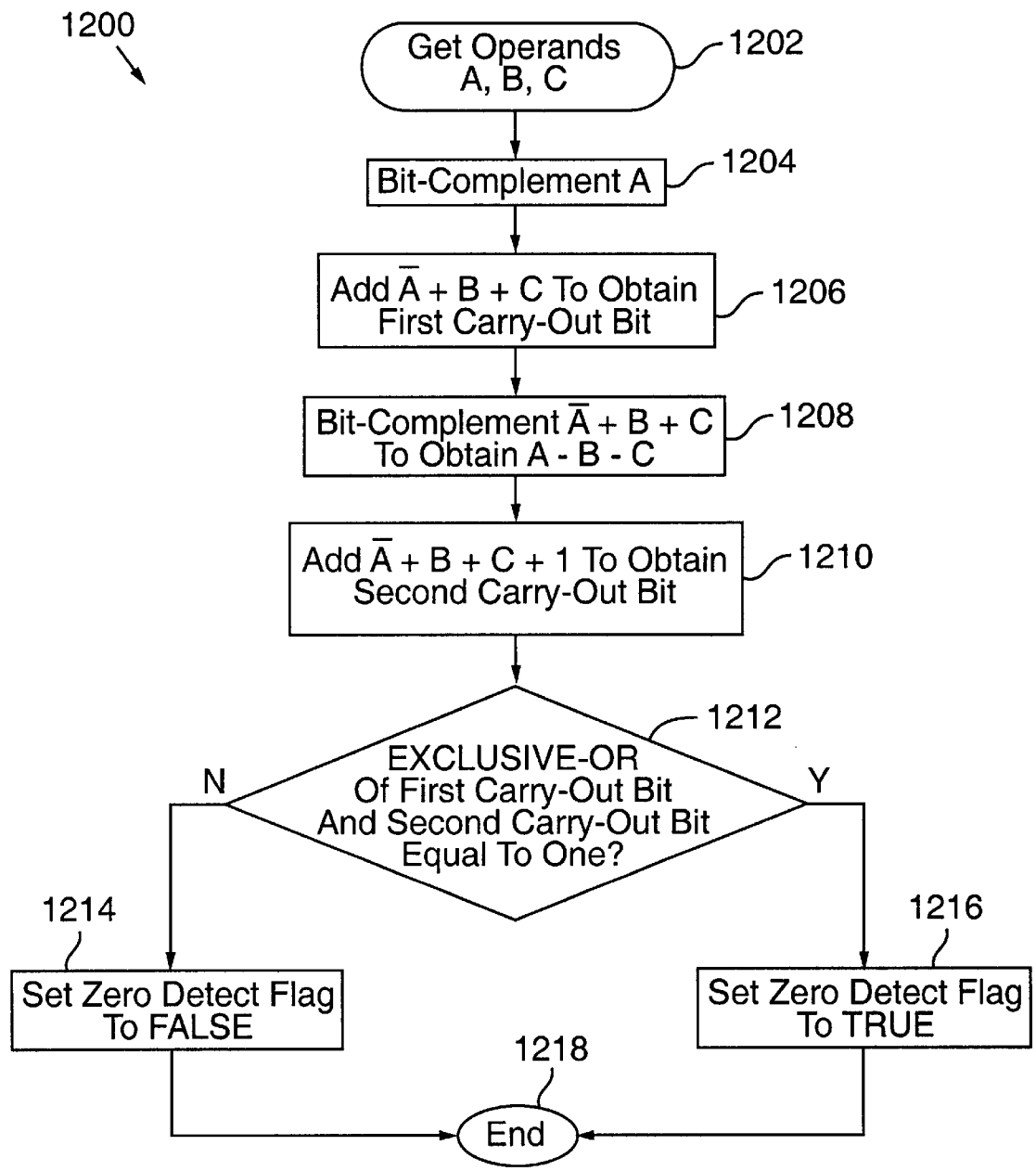

FIG. 12 is a flow chart of algorithm 1200 in accordance with another aspect of the invention. Algorithm 1200 provides an example of algorithm 500 using three operands. At step 1202, binary operands A, B and C are obtained. At step 1204 the A operand is bit-complemented to obtain $\overline{A}$. At step 1206, $\overline{A}$ and B and C are added to obtain a first carry-out bit. At step 1208, the sum $\overline{A}$+B+C is bit-complemented to obtain the difference of A−B−C. At step 1210, $\overline{A}$ and B and C and one are added to obtain a second carry-out bit. Decision step 1212 then tests whether the EXCLUSIVE-OR of the first carry-out bit from $\overline{A}$+B+C and the second carry-out bit from $\overline{A}$+B+C+1 is a one. If so, the zero detect flag is set to TRUE at step 1216 and the algorithm ends at step 1218, otherwise the zero detect flag is set to FALSE at step 1214 and the algorithm ends at step 1218.

In algorithms 200, 300, 400, 700, 800, 900 and 1000 various numbers are summed to obtain a result, the carry-out bit of the result is discarded, and then another carry-out bit generated by incrementing the result (that is, adding one to the result) is inspected to determine zero detect of a binary difference. While these approaches are efficient in terms of hardware utilization, the sequential summing and incrementing steps may require separate instruction cycles or present other time delays. In algorithms 500, 600, 1100 and 1200, the first and second carry-out bits can be generated concurrently, thereby expediting the operation and facilitating zero detect of a binary difference in a single instruction cycle.

Variations to algorithms 200 through 1200 are apparent. For instance, setting the carry flag in algorithms 700, 900 and 1100 is optional, as is calculating the difference of the operands in algorithms 900 through 1200. When multiple subtrahends are subtracted from the minuend, the subtrahends can be subtracted in any order, or alternatively a sum of the subtrahends can be subtracted from the minuend. The zero detect flag is interchangeable with an equal flag set to TRUE when two binary operands (or a binary operand and a sum of binary operands) are equal to one another. The first and second carry-out bits can be generated in any order or simultaneously. Furthermore, when the first and second carry-out bits are generated in algorithm 600, the sum upon which the first and second carry-out bits are based need not be calculated, for instance by use of PG generator sections and carry chains without sum generators.

Various examples of two binary operands applied to algorithm 700 are listed below in Table 1. A difference of the operands is obtained, and the carry-out bit of the difference is inspected. The difference of the operands is bit-complemented, and then incremented by one. In summary, if the carry-out bit from the incremented difference is a one then set the zero detect flag to TRUE, otherwise set the zero detect flag to FALSE. In algorithm 700, the two carry-out bits are generated sequentially. The carry-out bit of A−B in column 2 obviously provides carry detect for A−B, but is not used for zero detect. The carry-out bit of $(\overline{A-B})+1$ in columns 4 and 5 indicates an overflow condition for a string of one's, and therefore provides zero detect, but is not used for carry detect of A−B.

TABLE 1

ZERO DETECT OF TWO OPERANDS USING ALGORITHM 700

| Operands A, B | Subtract A − B $(A + \overline{B} + 1)$ | Complement $\overline{A-B}$ | Increment $\overline{A-B}$ | Carry-Out Bit of $(\overline{A-B}) + 1$ | Zero Detect Flag |
|---|---|---|---|---|---|
| 1001 | 1001 | 0010 | 1101 | Zero | False |
| 0111 | 1000 | ↓ | + 0001 | | |
| | + 0001 | 1101 | 0 1110 | | |
| | 1 0010 | | | | |
| 0110 | 0110 | 0000 | 1111 | One | True |

TABLE 1-continued

ZERO DETECT OF TWO OPERANDS USING ALGORITHM 700

| Operands A, B | Subtract A − B $(A + \overline{B} + 1)$ | Complement $\overline{A-B}$ | Increment $\overline{A-B}$ | Carry-Out Bit of $(\overline{A-B}) + 1$ | Zero Detect Flag |
|---|---|---|---|---|---|
| 0110 | 1001 | ↓ | + 0001 | | |
| | + 0001 | 1111 | 1 0000 | | |
| | 1 0000 | | | | |
| 0101 | 0101 | 1110 | 0001 | Zero | False |
| 0111 | 1000 | ↓ | + 0001 | | |
| | + 0001 | 0001 | 0 0010 | | |
| | 0 1110 | | | | |
| 0111 | 0111 | 1110 | 0001 | Zero | False |
| 1001 | 0110 | ↓ | + 0001 | | |
| | + 0001 | 0001 | 0 0010 | | |
| | 0 1110 | | | | |
| 1010 | 1010 | 0000 | 1111 | One | True |
| 1010 | 0101 | ↓ | + 0001 | | |
| | + 0001 | 1111 | 1 0000 | | |
| | 1 0000 | | | | |
| 0000 | 0000 | 0000 | 1111 | One | True |
| 0000 | 1111 | ↓ | + 0001 | | |
| | + 0001 | 1111 | 1 0000 | | |
| | 1 0000 | | | | |

Various examples of three binary operands applied to algorithm 800 are listed below in Table 2. A difference of the minuend and the two subtrahends is bit-complemented, and then incremented by one. In summary, if the carry-out bit from the incremented difference is a one then set the zero detect flag to TRUE, otherwise set the zero detect flag to FALSE.

TABLE 2

ZERO DETECT OF THREE OPERANDS USING ALGORITHM 800

| Operands A, B, C | Subtract A − B − C $(A + \overline{B} + \overline{C} + 2)$ | Complement $\overline{A-B-C}$ | Increment $\overline{A-B-C}$ | Carry-Out Bit of $(\overline{A-B-C}) + 1$ | Zero Detect Flag |
|---|---|---|---|---|---|
| 1001 | 1001 | 0010 | 1101 | Zero | False |
| 0110 | 1001 | ↓ | + 0001 | | |
| 0001 | 1110 | 1101 | 0 1110 | | |
| | + 0010 | | | | |
| | 10 0010 | | | | |
| 0110 | 0110 | 0000 | 1111 | One | True |
| 0100 | 1011 | ↓ | + 0001 | | |
| 0010 | 1101 | 1111 | 1 0000 | | |
| | + 0010 | | | | |
| | 10 0000 | | | | |
| 0101 | 0101 | 1110 | 0001 | Zero | False |
| 0100 | 1011 | ↓ | + 0001 | | |
| 0011 | 1100 | 0001 | 0 0010 | | |
| | + 0010 | | | | |
| | 01 1110 | | | | |
| 0000 | 0000 | 0000 | 1111 | One | True |
| 1111 | 0000 | ↓ | + 0001 | | |

TABLE 2-continued

ZERO DETECT OF THREE OPERANDS USING ALGORITHM 800

| Operands A, B, C | Subtract A − B − C ($A + \overline{B} + \overline{C} + 2$) | Complement A − B − C | Increment $\overline{A-B-C}$ | Carry-Out Bit of $(\overline{A-B-C}) + 1$ | Zero Detect Flag |
|---|---|---|---|---|---|
| 0001 | 1110<br>+ 0010 | 1111 | 1 0000 | | |
| | 01 0000 | | | | |
| 1010<br>1000 | 1010<br>0111 | 0000<br>↓ | 1111<br>+ 0001 | One | True |
| 0010 | 1101<br>+ 0010 | 1111 | 1 0000 | | |
| | 10 0000 | | | | |
| 0000<br>0000 | 0000<br>1111 | 0000<br>↓ | 1111<br>+ 0001 | One | True |
| 0000 | 1111<br>+ 0010 | 1111 | 1 0000 | | |
| | 10 0000 | | | | |

Various examples of two binary operands applied to algorithm 900 are listed below in Table 3. The bit-complemented minuend and the subtrahend are added, and a carry-out bit is inspected to determine the complemented carry-out bit for the difference of the operands. The sum of the bit-complemented minuend and the subtrahend is bit-complemented to obtain the difference of the operands. The sum of the bit-complemented minuend and the subtrahend is also incremented. In summary, if the carry-out bit from the incremented sum is a one then set the zero detect flag to TRUE, otherwise set the zero detect flag to FALSE. In algorithm 900, the two carry-out bits are generated sequentially. The carry-out bit of $\overline{A}+B$ in column 2 can be inverted to provide carry detect for A−B, but is not used for zero detect. The carry-out bit of $(\overline{A}+B)+1$ in columns 4 and 5 indicates an overflow condition for a string of one's, and therefore provides zero detect, but is not used for carry detect of A−B.

TABLE 3

ZERO DETECT OF TWO OPERANDS USING ALGORITHM 900

| Operands A, B | Add $\overline{A} + B$ | Complement $\overline{\overline{A} + B}$ (A − B) | Increment $\overline{A} + B$ | Carry-Out Bit of $(\overline{A} + B) + 1$ | Zero Detect Flag |
|---|---|---|---|---|---|
| 1001<br>0111 | 0110<br>+ 0111 | 1101<br>↓ | 1101<br>+ 0001 | Zero | False |
| | 0 1101 | 0010 | 0 1110 | | |
| 0110<br>0110 | 1001<br>+ 0110 | 1111<br>↓ | 1111<br>+ 0001 | One | True |
| | 0 1111 | 0000 | 1 0000 | | |

TABLE 3-continued

ZERO DETECT OF TWO OPERANDS USING ALGORITHM 900

| Operands A, B | Add $\overline{A} + B$ | Complement $\overline{\overline{A} + B}$ (A − B) | Increment $\overline{A} + B$ | Carry-Out Bit of $(\overline{A} + B) + 1$ | Zero Detect Flag |
|---|---|---|---|---|---|
| 0101<br>0111 | 1010<br>+ 0111 | 0001<br>↓ | 0001<br>+ 0001 | Zero | False |
| | 1 0001 | 1110 | 0 0010 | | |
| 0111<br>1001 | 1000<br>+ 1001 | 0001<br>↓ | 0001<br>+ 0001 | Zero | False |
| | 1 0001 | 1110 | 0 0010 | | |
| 1010<br>1010 | 0101<br>+ 1010 | 1111<br>↓ | 1111<br>+ 0001 | One | True |
| | 0 1111 | 0000 | 1 0000 | | |
| 0000<br>0000 | 1111<br>+ 0000 | 1111<br>↓ | 1111<br>+ 0001 | One | True |
| | 0 1111 | 0000 | 1 0000 | | |

Various examples of three binary operands applied to algorithm 1000 are listed below in Table 4. The bit-complemented minuend and the two subtrahends are added, the sum of the bit-complemented minuend and the two subtrahends is bit-complemented to obtain the difference of the operands, and the sum of the bit-complemented minuend and the two subtrahends is incremented. In summary, if the carry-out bit from the incremented sum is one then set the zero detect flag to TRUE, otherwise set the zero detect flag to FALSE.

TABLE 4

ZERO DETECT OF THREE OPERANDS USING ALGORITHM 1000

| Operands A, B, C | Add $\overline{A} + B + C$ | Complement $\overline{A} + B + C$ $(A - B - C)$ | Increment $\overline{A} + B + C$ | Carry-Out Bit of $(\overline{A} + B + C) + 1$ | Zero Detect Flag |
|---|---|---|---|---|---|
| 1001 | 0110 | 1101 | 1101 | Zero | False |
| 0110 | 0110 | ↓ | + 0001 | | |
| 0001 | + 0001 | 0010 | 0 1110 | | |
| | 00 1101 | | | | |
| 0110 | 1001 | 1111 | 1111 | One | True |
| 0100 | 0100 | ↓ | + 0001 | | |
| 0010 | + 0010 | 0000 | 1 0000 | | |
| | 00 1111 | | | | |
| 0101 | 1010 | 0001 | 0001 | Zero | False |
| 0100 | 0100 | ↓ | + 0001 | | |
| 0011 | + 0011 | 1110 | 0 0010 | | |
| | 01 0001 | | | | |
| 0000 | 1111 | 1111 | 1111 | One | True |
| 1111 | 1111 | ↓ | + 0001 | | |
| 0001 | + 0001 | 0000 | 1 0000 | | |
| | 01 1111 | | | | |
| 1010 | 0101 | 1111 | 1111 | One | True |
| 1000 | 1000 | ↓ | + 0001 | | |
| 0010 | + 0010 | 0000 | 1 0000 | | |
| | 00 1111 | | | | |
| 0000 | 1111 | 1111 | 1111 | One | True |
| 0000 | 0000 | ↓ | + 0001 | | |
| 0000 | + 0000 | 0000 | 1 0000 | | |
| | 00 1111 | | | | |

Various examples of two binary operands applied to algorithm 1100 are listed below in Table 5. The bit-complemented minuend and the subtrahend are added, and a first carry-out bit is inspected initially to determine the complemented carry-out bit for the difference of the operands. The sum of the bit-complemented minuend and the subtrahend is bit-complemented to determine the difference of the operands. Furthermore, the bit-complemented minuend and the subtrahend and one are added, and a second carry-out bit is inspected. In summary, if the EXCLUSIVE-OR of the first carry-out bit and the second carry-out bit is a one then set the zero detect flag to TRUE, otherwise set the zero detect flag to FALSE. In algorithm 1100, the first and second carry-out bits are generated concurrently. The first carry-out bit of $\overline{A}+B$ in columns 2 and 3 can be inverted to provide carry detect for A−B. The second carry-out bit of $\overline{A}+B+1$ in columns 5 and 6 is not used for carry detect. However, both the first and second carry-out bits are inspected to indicate an overflow condition for a string of one's, and therefore provide zero detect.

TABLE 5

ZERO DETECT OF TWO OPERANDS USING ALGORITHM 1100

| Operands A and B | Add $\overline{A} + B$ | First Carry-Out Bit | Complement $\overline{A} + B$ $(A - B)$ | Add $\overline{A} + B + 1$ | Second Carry-Out Bit | Zero Detect Flag |
|---|---|---|---|---|---|---|
| 1001 | 0110 | Zero | 1101 | 0110 | Zero | False |
| 0111 | + 0111 | | ↓ | 0111 | | |
| | 0 1101 | | 0010 | + 0001 | | |
| | | | | 0 1110 | | |
| 0110 | 1001 | Zero | 1111 | 1001 | One | True |

TABLE 5-continued

ZERO DETECT OF TWO OPERANDS USING ALGORITHM 1100

| Operands A and B | Add $\overline{A} + B$ | First Carry-Out Bit | Complement $\overline{\overline{A} + B}$ (A − B) | Add $\overline{A} + B + 1$ | Second Carry-Out Bit | Zero Detect Flag |
|---|---|---|---|---|---|---|
| 0110 | + 0110 | | ↓ | 0110 | | |
| | 0 1111 | | 0000 | + 0001 | | |
| 0101 0111 | 1010 + 0111 | One | 0001 ↓ | 1 0000 1010 0111 | One | False |
| | 1 0001 | | 1110 | + 0001 | | |
| 0111 1001 | 1000 + 1001 | One | 0001 ↓ | 1 0010 1000 1001 | One | False |
| | 1 0001 | | 1110 | + 0001 | | |
| 1010 1010 | 0101 + 1010 | Zero | 1111 ↓ | 1 0010 0101 1010 | One | True |
| | 0 1111 | | 0000 | + 0001 | | |
| 0000 0000 | 1111 + 0000 | Zero | 1111 ↓ | 1 0000 1111 0000 | One | True |
| | 0 1111 | | 0000 | + 0001 | | |
| | | | | 1 0000 | | |

Various examples of three binary operands applied to algorithm 1200 are listed below in Table 6. The bit-complemented minuend and the two subtrahends are added, and a first carry-out bit is inspected. The sum of the bit-complemented minuend and the two subtrahends is bit-complemented to obtain the difference of the operands. Furthermore, the bit-complemented minuend and the two subtrahends and one are added, and a second carry-out bit is inspected. In summary, if the EXCLUSIVE-OR of the first carry-out bit and the second carry-out bit is a one then set the zero detect flag to TRUE, otherwise set the zero detect flag to FALSE.

TABLE 6

ZERO DETECT OF THREE OPERANDS USING ALGORITHM 1200

| Operands A, B, C | Add $\overline{A} + B + C$ | First Carry-Out Bit | Complement $\overline{\overline{A} + B + C}$ (A − B − C) | Add $\overline{A} + B + C + 1$ | Second Carry-Out Bit | Zero Detect Flag |
|---|---|---|---|---|---|---|
| 1001 0110 0001 | 0110 0110 + 0001 | Zero | 1101 ↓ 0010 | 0110 0110 0001 | Zero | False |
| | 00 1101 | | | + 0001 | | |
| | | | | 00 1110 | | |
| 0110 0100 0010 | 1001 0100 + 0010 | Zero | 1111 ↓ 0000 | 1001 0100 0010 | One | True |
| | 00 1111 | | | + 0001 | | |
| | | | | 01 0000 | | |
| 0101 0100 0011 | 1010 0100 + 0011 | One | 0001 ↓ 1110 | 1010 0100 0011 | One | False |
| | 01 0001 | | | + 0001 | | |
| | | | | 01 0010 | | |
| 0000 1111 | 1111 1111 | One | 1111 ↓ | 1111 1111 | Zero | True |

TABLE 6-continued

ZERO DETECT OF THREE OPERANDS USING ALGORITHM 1200

| Operands A, B, C | Add $\overline{A} + B + C$ | First Carry-Out Bit | Complement $\overline{A} + B + C$ (A − B − C) | Add $\overline{A} + B + C + 1$ | Second Carry-Out Bit | Zero Detect Flag |
|---|---|---|---|---|---|---|
| 0001 | + 0001 | | 0000 | 0001 | | |
| | 01 1111 | | | + 0001 | | |
| 1010 | 0101 | Zero | 1111 | 10 0000 0101 | One | True |
| 1000 | 1000 | | ↓ | 1000 | | |
| 0010 | + 0010 | | 0000 | 0010 | | |
| | 00 1111 | | | + 0001 | | |
| 0000 | 1111 | Zero | 1111 | 01 0000 1111 | One | True |
| 0000 | 0000 | | ↓ | 0000 | | |
| 0000 | + 0000 | | 0000 | 0000 | | |
| | 00 1111 | | | + 0001 | | |
| | | | | 01 0000 | | |

It should be noted that in Table 6, the first and second carry-out bits are generated from the most significant bit positions ($2^3$) of the respective sums, and therefore appear in the MSB+1 positions ($2^4$), whereas other carry-out bits that are generated from the MSB+1 positions ($2^4$) and appear in the MSB+2 bit positions ($2^5$) are discarded. For instance, in the fourth example in Table 6, at the sum in column 2 the first carry-out bit in the $2^4$ bit position is a one and the other carry-out bit in the $2^5$ bit position is a zero and is discarded, whereas at the sum in column 5 the second carry-out bit in the $2^4$ bit position is a zero and the other carry-out bit in the $2^5$ bit position is a one and is discarded.

Figure 13:
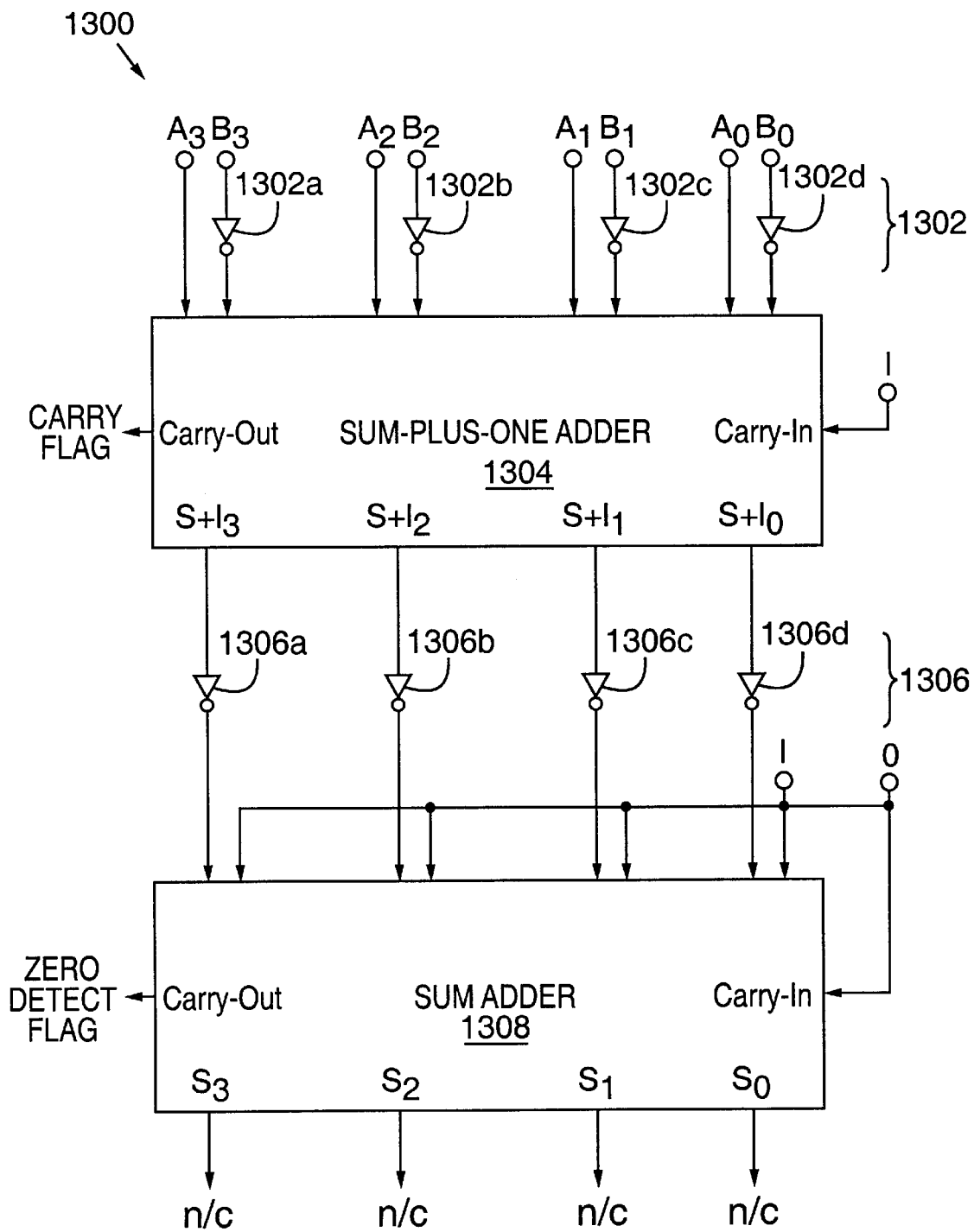
FIG. 13 is a block diagram of a logic circuit for performing zero detect of a binary difference of two operands by inspecting a single carry-out bit in accordance with an embodiment of the invention.

FIG. 13 is a block diagram of a logic circuit 1300 for zero detection of a difference of two four-bit binary operands A and B in accordance with algorithm 700. First inverter circuit 1302 has an operand input coupled to the B operand to provide a bit-complemented B operand at its output. First inverter circuit 1302 includes inverters 1302a, 1302b, 1302c and 1302d. Operand B has bit $B_3$ applied to inverter 1302a, bit $B_2$ applied to inverter 1302b, bit $B_1$ applied to inverter 1302c, and bit $B_0$ applied to inverter 1302d, such that inverters 1302a, 1302b, 1302c and 1302d output bits $\overline{B_3}$, $\overline{B_2}$, $\overline{B_1}$ and $\overline{B_0}$, respectively. Sum-plus-one adder 1304 has operand inputs coupled to A and $\overline{B}$, such that bits $A_3$ and $\overline{B_3}$ are applied to stage 3 of adder 1304, bits $A_2$ and $\overline{B_2}$ are applied to stage 2 of adder 1304, bits $A_1$ and $\overline{B_1}$ are applied to stage 1 of adder 1304, and bits $A_0$ and $\overline{B_0}$ are applied to stage 0 of adder 1304. Furthermore, the carry-in bit of sum-plus-one adder 1304 is set to one. Accordingly, sum-plus-one adder 1304 generates a sum-plus-one output of A+$\overline{B}$+1 (which is equivalent to A−B), consisting of bits S+$1_3$, S+$1_2$, S+$1_1$ and S+$1_0$, and a carry-out bit. The carry-out bit of sum-plus-one adder 1304 can be used to set a carry flag for the difference of A and B. Second inverter circuit 1306 bit-complements the sum-plus-one output. Second inverter circuit 1306 includes inverters 1306a, 1306b, 1306c and 1306d. Bit S+$1_3$ is applied to inverter 1306a, bit S+$1_2$ is applied to inverter 1306b, bit S+$1_1$ is applied to inverter 1306c, and bit S+$1_0$ is applied to inverter 1306d. Inverters 1306a, 1306b, 1306c and 1306d generate respective bit-complemented sum-plus-one output bits $\overline{S+1_3}$, $\overline{S+1_2}$, $\overline{S+1_0}$. Sum adder 1308 has a first operand input coupled to second inverter circuit 1306, and a second operand input coupled to a binary one. Bit $\overline{S+1_3}$ and a logical 0 are applied to stage 3 of sum adder 1308, bit $\overline{S+1_2}$ and a logical 0 are applied to stage 2 of sum adder 1308, bit $\overline{S+1_1}$ and a logical 0 are applied to stage 1 of sum adder 1308, and bit $\overline{S+1_0}$ and a logical 1 are applied to stage 0 of sum adder 1308. Furthermore, the carry-in bit of sum adder 1308 is set to zero. Accordingly, sum adder 1308 generates a sum output of $$\overline{A + \overline{B} + 1} + 1,$$

consisting of bits $S_3$, $S_2$, $S_1$ and $S_0$, and a carry-out bit. The sum output of sum adder 1308 is discarded. However, the carry-out bit of sum adder 1308 provides a zero detect flag. When the carry-out bit of sum adder 1308 is a one the zero detect flag is TRUE, and when the carry-out bit of sum adder 1308 is a zero the zero detect flag is FALSE.

Figure 14:
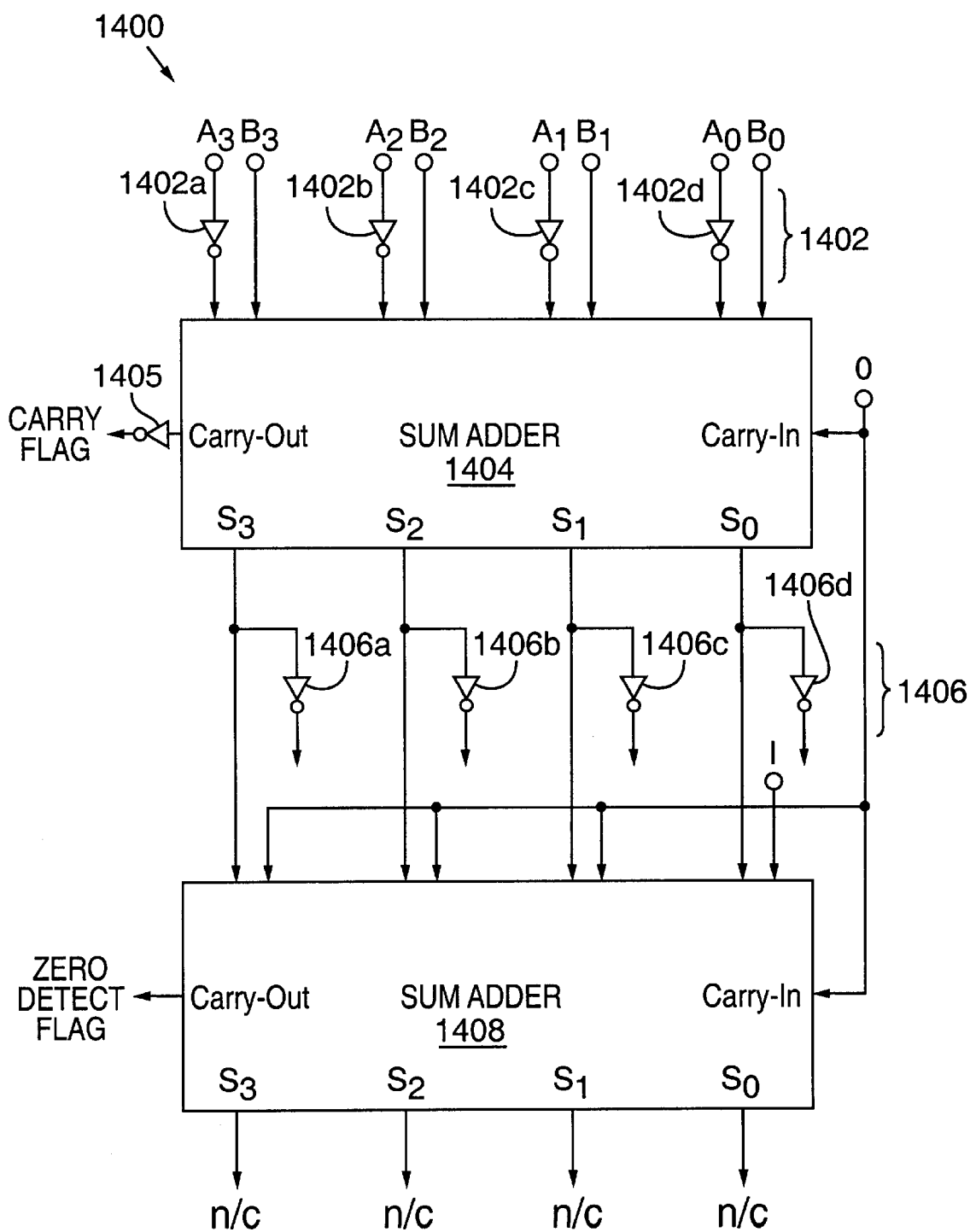
FIG. 14 is a block diagram of a logic circuit for performing zero detect of a binary difference of two operands by inspecting a single carry-out bit in accordance with an embodiment of the invention.

FIG. 14 is a block diagram of a logic circuit 1400 for zero detection of a difference of two four-bit binary operands A and B in accordance with algorithm 900. First inverter circuit 1402 has an operand input coupled to the A operand to provide a bit-complemented A operand at its output. First inverter circuit 1402 includes inverters 1402a, 1402b, 1402c and 1402d. Operand A has bit $A_3$ applied to inverter 1402a, bit $A_2$ applied to inverter 1402b, bit $A_1$ applied to inverter 1402c, and bit $A_0$ applied to inverter 1402d, such that inverters 1402a, 1402b, 1402c and 1402d output bits $\overline{A_3}$, $\overline{A_2}$, $\overline{A_1}$ and $\overline{A_0}$, respectively. Sum adder 1404 has operand inputs coupled to $\overline{A}$ and B, such that bits $\overline{A_3}$ and $B_3$ are applied to stage 3 of adder 1404, bits $\overline{A_2}$ and $B_2$ are applied to stage 2 of adder 1404, bits $\overline{A_1}$ and $B_1$ are applied to stage 1 of adder 1404, and bits $\overline{A_0}$ and $B_0$ are applied to stage 0 of adder 1404. Furthermore, the carry-in bit of sum adder 1404 is set to zero. Accordingly, sum adder 1404 generates a sum output of $\overline{A}$+B, consisting of bits $S_3$, $S_2$, $S_1$ and $S_0$, and a carry-out bit. The carry-out bit of sum adder 1404 is inverted by inverter 1405 to set a carry flag for the difference of A and B. Second inverter circuit 1406 bit-complements the sum output to provide the difference A−B. Second inverter circuit 1406 includes inverters 1406a, 1406b, 1406c and 1406d. Bit $S_3$ is applied to inverter 1406a, bit $S_2$ is applied to inverter 1406b, bit $S_1$ is applied to inverter 1406c, and bit $S_0$ is applied to inverter 1406d. Inverters 1406a, 1406b, 1406c and 1406d generate respective bit-complemented sum output bits for providing the binary difference. Sum adder 1408 has a first operand input coupled to the sum output of sum adder 1404, and a second operand input coupled to a binary one. Bit $S_3$ and a logical 0 are applied to stage 3 of sum adder 1408, bit $S_2$ and a logical 0 are applied to stage 2 of sum adder 1408, bit $S_1$ and a logical 0 are applied to stage 1 of sum adder 1408, and bit $S_0$ and a logical 1 are applied to stage 0 of sum adder 1408. Furthermore, the carry-in bit of sum adder 1408 is set to zero.

Accordingly, sum adder 1408 generates a sum output of $\overline{A}+B+1$, which is discarded. However, the carry-out bit of sum adder 1408 provides a zero detect flag. When the carry-out bit of sum adder 1408 is a one the zero detect flag is TRUE, and when the carry-out bit of sum adder 1408 is a zero the zero detect flag is FALSE.

A drawback to logic circuits 1300 and 1400, and the variations thereof, is that the carry-out bit for setting the zero detect flag cannot be generated until at least one sum operation has occurred. That is, although sum adders 1308 and 1408 can be replaced by carry generators, sum-plus-one adder 1304 and sum adder 1404 cannot since the respective sums are required. The delay associated with first generating the sum and then generating the carry-out bit for the zero detect flag may prevent the operation from occurring in a single instruction cycle.

Figure 15:
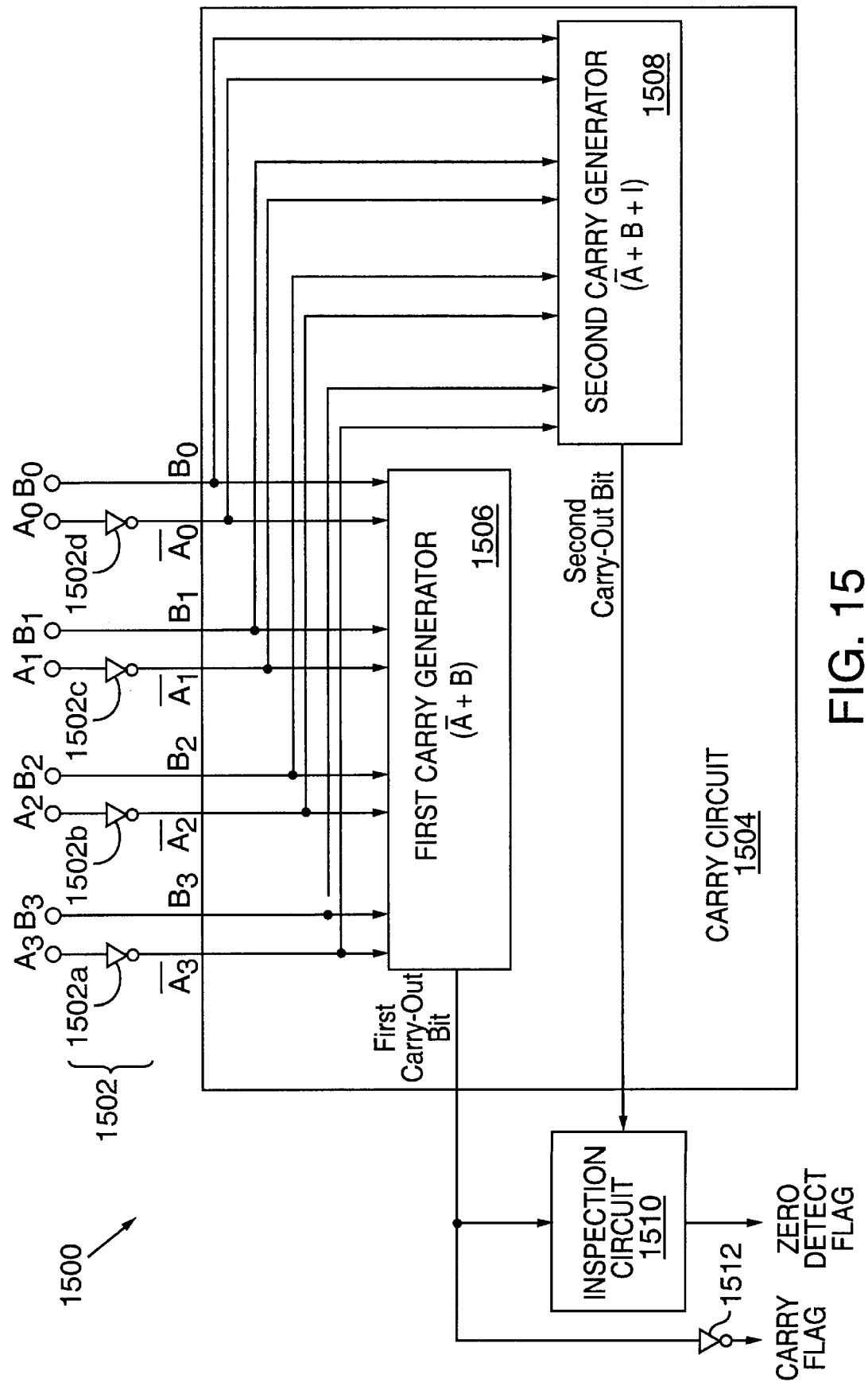
FIG. 15 is a block diagram of a logic circuit for performing zero detect of a binary difference of two operands by inspecting first and second carry-out bits in accordance with an embodiment of the invention.

FIG. 15 is a block diagram of a logic circuit 1500 for zero detection of a difference of two four-bit binary operands A and B in accordance with another embodiment of the invention. First inverter circuit 1502 has an operand input coupled to the A operand to provide a bit-complement of the A operand at its output. First inverter circuit 1502 includes inverters 1502a, 1502b, 1502c and 1502d. Operand A has bit $A_3$ applied to inverter 1502a, bit $A_2$ applied to inverter 1502b, bit $A_1$ applied to inverter 1502c, and bit $A_0$ applied to inverter 1502d, such that inverters 1502a, 1502b, 1502c and 1502d output bits $\overline{A_3}$, $\overline{A_2}$, $\overline{A_1}$ and $\overline{A_0}$, respectively. Carry circuit 1504 receives $\overline{A}$ and B at its operand inputs. In particular, bits $\overline{A_3}$ and $B_3$ are applied to stage 3 of carry circuit 1504, bits $\overline{A_2}$ and $B_2$ are applied to stage 2 of carry circuit 1504, bits $\overline{A_1}$ and $B_1$ are applied to stage 1 of carry circuit 1504, and bits $\overline{A_0}$ and $B_0$ are applied to stage 0 of carry circuit 1504. Carry circuit 1504 includes first carry generator 1506 and second carry generator 1508. First carry generator 1506 provides a first carry-out bit corresponding to the carry-out bit from the most significant bit position (stage 3) of the sum of $\overline{A}$ plus B. Similarly, second carry generator 1508 provides a second carry-out bit corresponding to the carry-out bit from the most significant bit position (stage 3) of the sum of $\overline{A}$ plus B plus one. Inspection circuit 1510 receives the first and second carry-out bits from carry circuit 1504, outputs a logical one (thereby setting the zero detect flag to TRUE) if the first carry-out bit and the second carry-out bit have different logical values, and outputs a logical zero (thereby setting the zero detect flag to FALSE) if the first carry-out bit and the second carry-out bit have the same logical value. Preferably, inspection circuit 1510 is implemented by an EXCLUSIVE-OR gate that receives the first and second carry-in bits, and outputs the zero detect flag. Inverter 1512 receives the first carry-out bit from carry circuit 1504, outputs a logical one (thereby setting the carry flag to TRUE) if the first carry-out bit is a zero, and outputs a logical zero (thereby setting the carry flag to FALSE) if the first carry-out bit is a one. Thus, the outputs of inspection circuit 1510 and inverter 1512 constitute the outputs of logic circuit 1500. Advantageously, first carry generator 1506 and second carry generator 1508 can determine the first and second carry-out bits concurrently, thereby providing for rapid zero detect.

Figure 16:
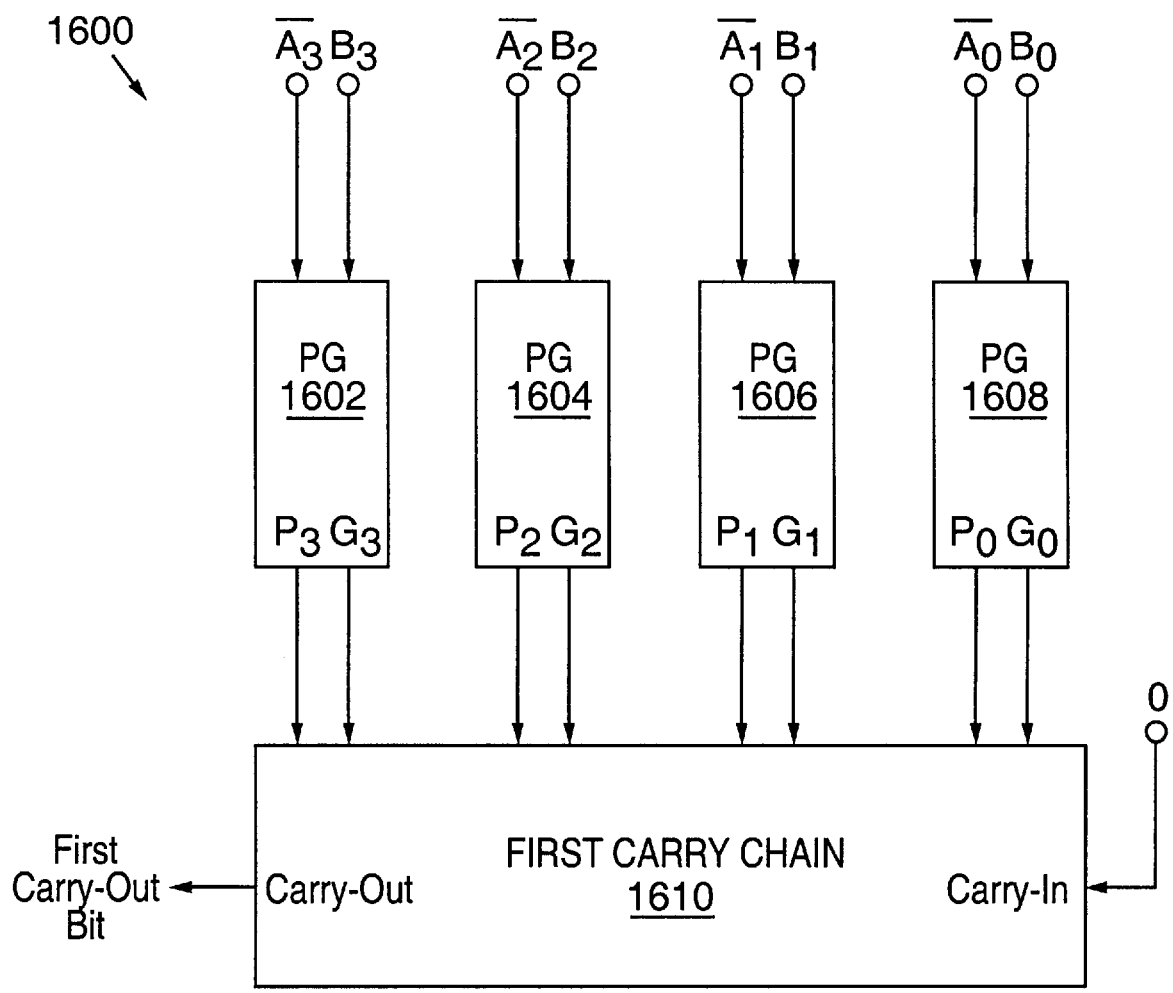
FIG. 16 is a block diagram of a carry circuit suitable for use in the logic circuit of FIG. 15.
Figure 16:
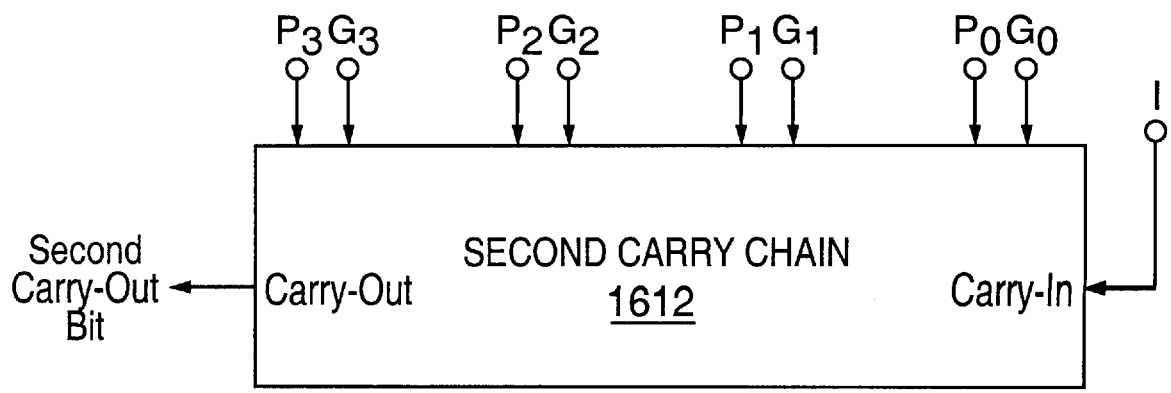

FIG. 16 shows an implementation for carry circuit 1504. Circuit 1600 includes propagate-generate (PG) sections 1602, 1604, 1606 and 1608 that receive bits $\overline{A_3}$ and $B_3$, $\overline{A_2}$ and $B_2$, $\overline{A_1}$ and $B_1$, and $\overline{A_0}$ and $B_0$, respectively. PG sections 1602, 1604, 1606 and 1608 provide propagate and generate signals $P_3$ and $G_3$, $P_2$ and $G_2$, $P_1$ and $G_1$, and $P_0$ and $G_0$, respectively, to respective stages of first carry chain 1610 and second carry chain 1612. First carry chain 1610 receives a "0" at its carry-in bit, and second carry chain 1612 receives a "1" at its carry-in bit. As a result, first carry chain 1610 provides the first carry-out bit, corresponding to the sum of $\overline{A}+B$, whereas second carry chain 1612 provides the second carry-out bit, corresponding to the sum of $\overline{A}+B+1$. In this manner, PG sections 1602, 1604, 1606 and 1608 and first carry chain 1610 implement first carry generator 1506, and PG sections 1602, 1604, 1604 and 1608 and second carry chain 1612 implement second carry generator 1508.

Figure 17:
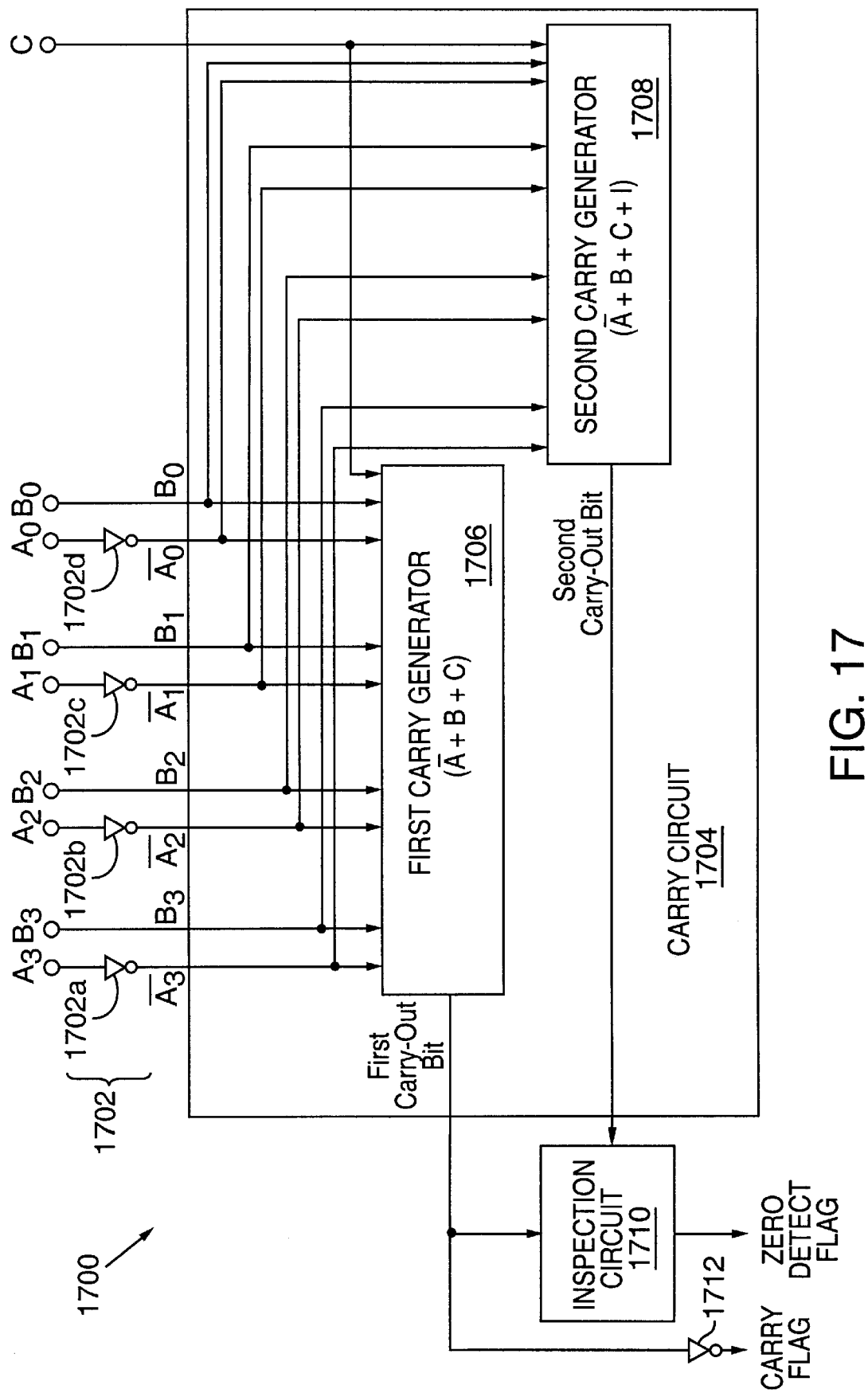
FIG. 17 is a block diagram of a logic circuit for performing zero detect of a binary difference of three operands (a minuend and two subtrahends) by inspecting first and second carry-out bits in accordance with an embodiment of the invention.

FIG. 17 is a block diagram of a logic circuit 1700 for zero detection of a difference of four-bit binary operands A and B and carry-in bit operand C in accordance with another embodiment of the invention. In this embodiment, A is the minuend, and B and C are the subtrahends. Logic circuit 1700 is similar to logic circuit 1500 in several respects. For instance, inverter circuit 1702 is similar to inverter circuit 1502, inspection circuit 1710 is similar to inspection circuit 1510, and inverter 1712 is similar to inverter 1512. However, carry circuit 1704 receives $\overline{A}$ and B and C at its operand inputs. In particular, bits $\overline{A_3}$ and $B_3$ are applied to stage 3 of carry circuit 1704, bits $\overline{A_2}$ and $B_2$ are applied to stage 2 of carry circuit 1704, and bits $\overline{A_1}$ and $B_1$ are applied to stage 1 of carry circuit 1704, and bits $\overline{A_0}$ and $B_0$ and C are applied to stage 0 of carry circuit 1704. Carry circuit 1704 includes first carry generator 1706 and second carry generator 1708. First carry generator 1706 provides a first carry-out bit corresponding to the carry-out bit from the most significant bit position (stage 3) of the sum of $\overline{A}$ plus B plus C. Similarly, second carry generator 1708 provides a second carry-out bit corresponding to the carry-out bit from the most significant bit position (stage 3) of the sum of $\overline{A}$ plus B plus C plus one. Inspection circuit 1710 receives the first and second carry-out bits from carry circuit 1704, outputs a logical one (thereby setting the zero detect flag to TRUE) if the first carry-out bit and the second carry-out bit have different logical values, and outputs a logical zero (thereby setting the zero detect flag to FALSE) if the first carry-out bit and the second carry-out bit have the same logical value. Likewise, inverter 1712 receives the first carry-out bit and provides a carry flag. Thus, the outputs of inspection circuit 1710 and inverter 1712 constitute the outputs of logic circuit 1700. Advantageously, first carry generator 1706 and second carry generator 1708 can determine the first and second carry-out bits concurrently, thereby providing for rapid zero detect.

Figure 18:
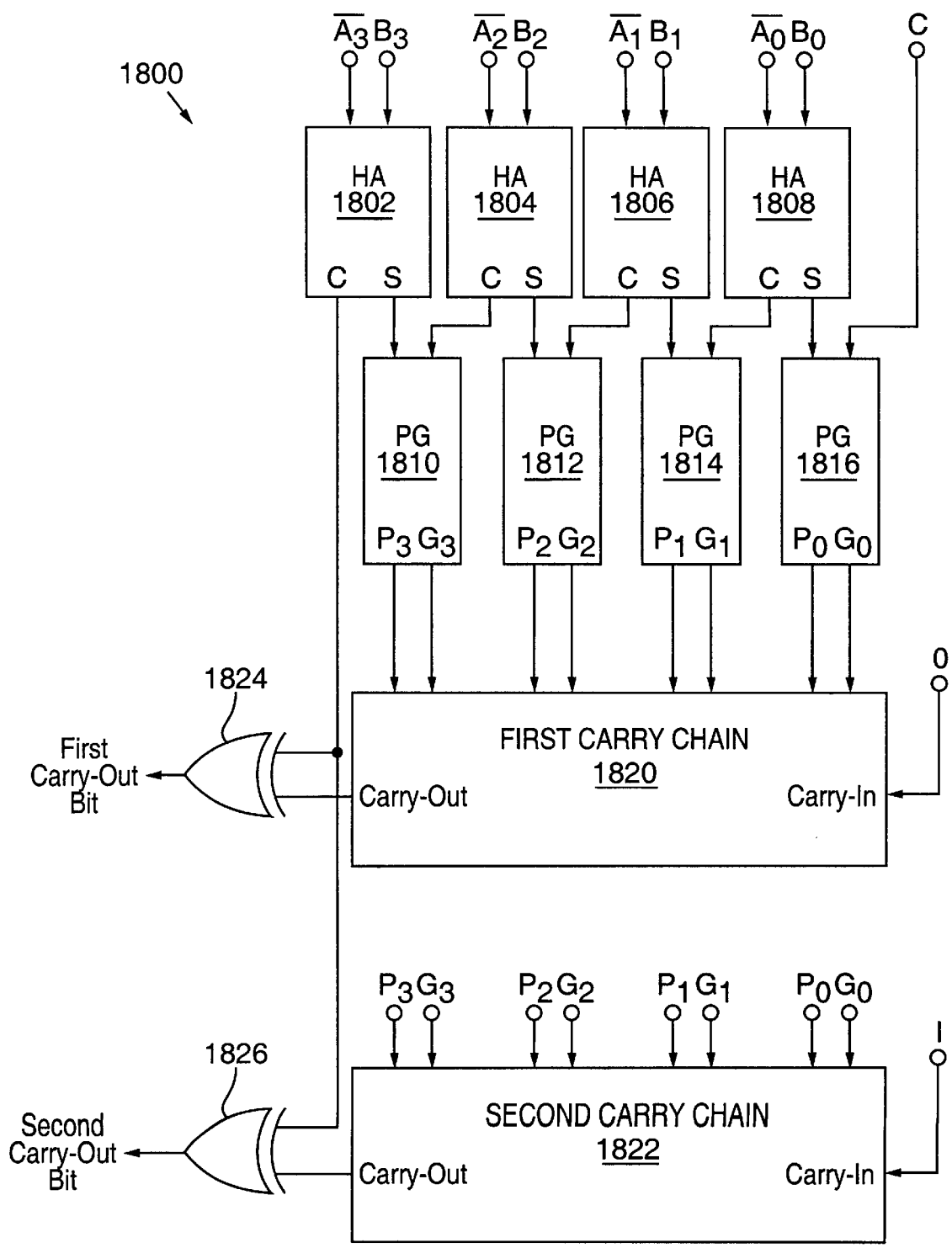
FIGS. 18 is a block diagram of a carry circuit suitable for use in the logic circuit of FIG. 17.

FIG. 18 shows an implementation for carry circuit 1704. Circuit 1800 includes half adders 1802, 1804, 1806 and 1808 for receiving bits $\overline{A_3}$ and $B_3$, $\overline{A_2}$ and $B_2$, $\overline{A_1}$ and $B_1$, and $\overline{A_0}$ and $B_0$, respectively. The half adders are coupled to propagate-generate (PG) sections 1810, 1812, 1814 and 1816 that provide a PG generator. In particular, the sum bit of half adder 1808 and the operand C are coupled to PG section 1816, the sum bit of half adder 1806 and the carry-out bit of half adder 1808 are coupled to PG section 1814, the sum bit of half adder 1804 and the carry-out bit of half adder 1806 are coupled to PG section 1812, and the sum bit of half adder 1802 and the carry-out bit of half adder 1804 are coupled to PG section 1810. PG sections 1810, 1812, 1814 and 1816 provide propagate and generate signals $P_3$ and $G_3$, $P_2$ and $G_2$, $P_1$ and $G_1$, and $P_0$ and $G_0$ to respective stages of first carry chain 1820 and second carry chain 1822. The propagate and generate signals and the carry-out bit from half adder 1802 correspond to the sum of $\overline{A}$ plus B plus C. First carry chain 1820 receives a "0" at its carry-in bit, and second carry chain 1822 receives a "1" at its carry-in bit. First EXCLUSIVE-OR gate 1824 receives the carry-out bit of half adder 1802 and the carry-out bit of first carry-chain 1820 at its inputs, and second EXCLUSIVE-OR gate 1826 receives the carry-out bit of half adder 1802 and the carry-out bit of second carry chain 1822 at its inputs. As a result, first EXCLUSIVE-OR gate 1824 provides the first carry-out bit, corresponding to the sum of $\overline{A}$ plus B plus C, whereas second EXCLUSIVE-OR gate 1826 provides the second carry-out bit, corresponding to the sum of $\overline{A}$ plus B plus C plus one. In this manner, half adders 1802, 1804, 1806 and 1808, PG sections 1810, 1812, 1814 and 1816, first carry chain 1820 and first EXCLUSIVE-OR gate 1824 implement first carry generator 1706, and half adders 1802, 1804, 1806 and 1808, PG sections 1810, 1812, 1814 and 1816, second carry chain 1822 and second EXCLUSIVE-OR gate 1826 implement second carry generator 1708.

When C is a zero, circuit 1800 provides the same result as circuit 1600, as it should since a zero C has no effect on the difference of operands A and B. However, when C is a one, first EXCLUSIVE-OR gate 1824 generates the first carry-out bit based on the sum of $\overline{A}+B+1$, and second EXCLUSIVE-OR gate 1826 generates the second carry-out bit based on the sum of $\overline{A}+B+2$, thereby providing the correct result.

Figure 19:
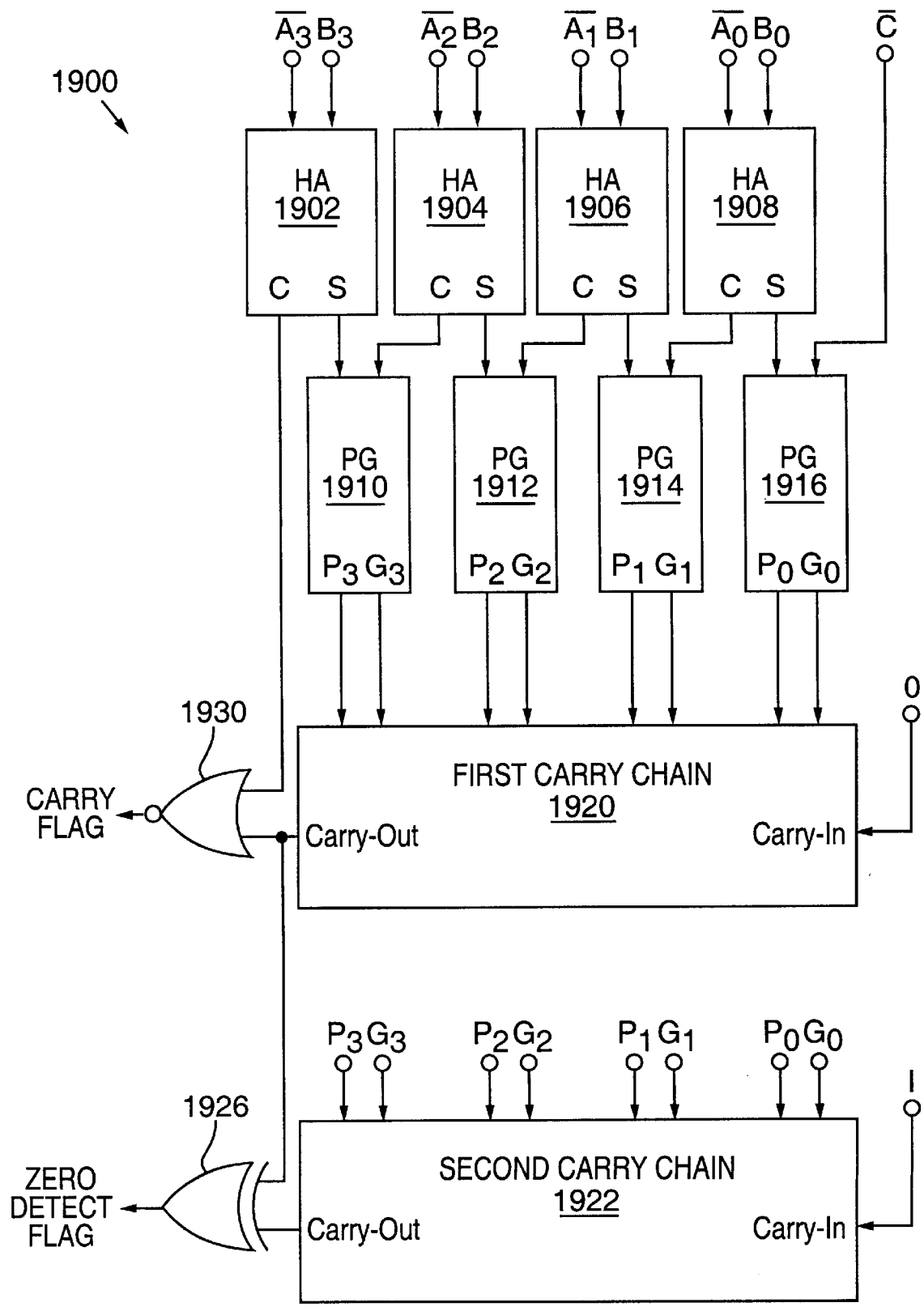
FIG. 19 is a block diagram of a combined carry circuit, inspection circuit and inverter suitable for use in the logic circuit of FIG. 17.

FIG. 19 shows an implementation of carry circuit 1704, inspection circuit 1710, and inverter 1712 in combination. Circuit 1900 is similar to circuit 1800, that is, half adder 1902 corresponds to half adder 1802, etc., except that NOR gate 1930 replaces EXCLUSIVE-OR gate 1824, and EXCLUSIVE-OR gate 1926 receives the carry-out bits from first carry chain 1920 and second carry chain 1922. Since the carry-out bits from half adder 1902 and first carry chain 1920 will not both be one's, EXCLUSIVE-OR gate 1824 can be replaced by an OR gate, and the combination of the OR gate and inverter 1712 can be implemented by NOR gate 1930 which provides the carry flag. It is observed that when the carry-out bit of half adder 1802 is a zero, then the carry-out bits of carry chains 1820 and 1822 provide the first and second carry-out bits, respectively. Likewise, when the carry-out bit of half adder 1802 is a one, then the complements of the carry-out bits of carry chains 1820 and 1822 provide the first and second carry-out bits, respectively. Since inspection circuit 1710 evaluates whether the first and second carry-out bits have the same or different logical values, it makes no difference whether the first and second carry-out bits are both complemented (or toggled). Thus, EXCLUSIVE-OR gates 1824 and 1826 and inspection circuit 1712 can be implemented by EXCLUSIVE-OR gate 1926 which provides the zero detect flag. Accordingly, half adders 1902, 1904 1906 and 1908, PG sections 1910, 1912, 1914 and 1916, first carry chain 1920 and NOR gate 1930 implement first carry generator 1706 and inverter 1712, and half adders 1902 (without the carry-out bit), 1904, 1906 and 1908, PG sections 1910, 1912, 1914 and 1916, first carry chain 1920, second carry chain 1922 and EXCLUSIVE-OR gate 1926 implement first carry generator 1706, second carry generator 1708 and inspection circuit 1710.

The description of the invention set forth herein is illustrative, and is not intended to limit the scope of the invention as set forth in the following claims. For example, the hardware set forth herein can be implemented in any suitable circuitry, and expanded to accommodate more operands and operands of various lengths as desired. Suitable PG generators, carry chains, inverter circuits, and adders are well-known in the art. A general purpose computer or processor can execute the invention in a single instruction cycle (as is preferred) or multiple instruction cycles. The invention is well-suited for many applications including zero detect and compare operations, and is readily adaptable for detection of all one's within various patterns. Variations and modifications of the embodiments disclosed herein may be made based on the description set forth herein, without departing from the scope and spirit of the invention as set forth in the following claims.

What is claimed is:

1. A method of operating a circuit to determine whether a difference of operands is zero, comprising:

providing a result representing a bit-complement of the difference; and inspecting a carry-out bit generated by incrementing the result.

2. The method of claim 1, wherein the carry-out bit is a one when the bit-complement of the difference consists of one's, and the carry-out bit is a zero when the bit-complement of the difference includes any zero's.

3. The method of claim 1, further including setting a zero detect flag to TRUE when the carry-out bit is a one, and setting the zero detect flag to FALSE when the carry-out bit is a zero.

4. The method of claim 1, further including setting an equal flag to a TRUE when the carry-out bit is a one, and setting the equal flag to a FALSE when the carry-out bit is a zero.

5. The method of claim 1, wherein providing the result includes calculating the difference and then bit-complementing the difference.

6. The method of claim 1, wherein providing the result includes calculating the difference and then decrementing the difference.

7. The method of claim 1, further including bit-complementing the result to provide the difference.

8. The method of claim 1, wherein the operands consist of a minuend and M subtrahends, and M is an integer of at least one.

9. The method of claim 8, wherein providing the result includes bit-complementing the minuend and adding the bit-complemented minuend and the M subtrahends.

10. The method of claim 8, wherein providing the result includes bit-complementing the M subtrahends and adding the minuend and the M bit-complemented subtrahends and a constant of M−1.

11. The method of claim 8, wherein M is in the range of one to two.

12. The method of claim 11, wherein the M subtrahends consist of first and second subtrahends, and the second subtrahend is a carry-in bit.

13. The method of claim 1, performed in a single instruction cycle.

14. The method of claim 1, performed by a processor.

15. A method of operating a circuit to determine whether a difference of a minuend and M subtrahends is zero, wherein M is an integer of at least one, comprising the steps of:

bit-complementing the minuend;

generating a first carry-out bit representing a carry-out bit from a most significant bit position of a sum of the bit-complemented minuend and the M subtrahends;

generating a second carry-out bit representing a carry-out bit from a most significant bit position of a sum of the bit-complemented minuend and the M subtrahends and a constant of one; and determining whether the first and second carry-out bits have different logical values.

16. The method of claim 15, performed in a single instruction cycle.

17. The method of claim 15, performed by a processor.

18. A method of operating a circuit to determine whether an n-bit difference of first and second n-bit operands is zero, wherein the first operand is a minuend and the second operand is a subtrahend, comprising the steps of:

bit-complementing the first operand;

generating a first carry-out bit representing a carry-out bit from a most significant bit position of an n-bit sum of the bit-complemented first operand and the second operand;

generating a second carry-out bit representing a carry-out bit from a most significant bit position of an n-bit sum of the bit-complemented first operand and the second operand and a constant of one; and determining whether the first and second carry-out bits have different logical values.

19. The method of claim 18, further including setting a zero detect flag to TRUE when the first and second carry-out bits have different logical values, and setting the zero detect flag to FALSE when the first and second carry-out bits have the same logical value.

20. The method of claim 18, further including complementing the first carry-out bit to provide a carry-out bit of the difference.

21. The method of claim 18, further including generating the first carry-out bit using a first carry chain without calculating the sum of the bit-complemented first operand and the second operand.

22. The method of claim 18, further including generating the second carry-out bit using a second carry chain without calculating the sum of the bit-complemented first operand and the second operand and the constant of one.

23. The method of claim 18, further including generating the first and second carry-out bits concurrently.

24. A method of operating a circuit to determine whether an n-bit difference of a first operand and second and third operands is zero, wherein the first operand is an n-bit minuend, the second operand is an n-bit subtrahend, and the third operand is a 1-bit subtrahend, comprising the steps of:

bit-complementing the first operand;

generating a first carry-out bit representing a carry-out bit of an n-bit sum of the bit-complemented first operand and the second and third operands;

generating a second carry-out bit representing a carry-out bit of an n-bit sum of the bit-complemented first operand and the second and third operands and a constant of one; and determining whether the first and second carry-out bits have different logical values.

25. The method of claim 24, further including setting a zero detect flag to TRUE when the first and second carry-out bits have different logical values, and setting the zero detect flag to FALSE when the first and second carry-out bits have the same logical value.

26. The method of claim 24, further including complementing the first carry-out bit to provide a carry-out bit of the difference.

27. The method of claim 24, further including generating the first carry-out bit using a first carry chain without calculating the sum of the bit-complemented first operand and the second and third operands.

28. The method of claim 24, further including generating the second carry-out bit using a second carry chain without calculating the sum of the bit-complemented first operand and the second and third operands and the constant of one.

29. The method of claim 24, further including generating the first and second carry-out bits concurrently.

30. An apparatus for determining whether a difference of first and second binary operands is zero, wherein the first operand is a minuend and the second operand is a subtrahend, the apparatus comprising:

a first inverter circuit for bit-complementing the second operand;

a sum-plus-one adder for receiving the first operand and the bit-complemented second operand for generating a sum-plus-one output representing a sum of the first operand and the bit-complemented second operand;

a second inverter circuit for bit-complementing the sum-plus-one output; and a carry generator for generating a carry-out bit based on incrementing the bit-complemented sum-plus-one output, wherein the carry-out bit provides a zero detect flag.

31. An apparatus for determining whether a difference of first and second binary operands is zero, wherein the first operand is a minuend and the second operand is a subtrahend, the apparatus comprising:

a first inverter circuit for bit-complementing the first operand;

a sum adder for receiving the bit-complemented first operand and the second operand for generating a sum output representing a sum of the bit-complemented first operand and the second operand; and a carry generator for generating a carry-out bit based on incrementing the sum output, wherein the carry-out bit provides a zero detect flag.

32. An apparatus for determining whether first and second binary operands are equal, comprising:

an inverter circuit for bit-complementing the first operand;

a first carry generator for generating a first carry-out bit based on a sum of the bit-complemented first operand and the second operand;

a second carry generator for generating a second carry-out bit based on a sum of the bit-complemented first operand and the second operand and a constant of one; and an inspection circuit for determining whether the first and second carry-out bits have different logical values.

33. The apparatus of claim 32, wherein the first carry generator includes a sum adder that calculates the sum of the bit-complemented first operand and the second operand.

34. The apparatus of claim 32, wherein the inspection circuit sets an equal flag to TRUE when the first and second carry-out bits have different logical values, and the inspection circuit sets the equal flag to FALSE when the first and second carry-out bits have the same logical value.

35. An apparatus for determining whether a difference of a minuend and M subtrahends is zero, wherein the minuend and the M subtrahends are binary operands and M is an integer of at least one, the apparatus comprising:

an inverter circuit for bit-complementing the minuend;

a first carry generator for generating a first carry-out bit based on a sum of the bit-complemented minuend and the M subtrahends;

a second carry generator for generating a second carry-out bit based on a sum of the bit-complemented minuend and the M subtrahends and a constant of one; and an inspection circuit for determining whether the first and second carry-out bits have different logical values.

36. The apparatus of claim 35, wherein the inspection circuit sets a zero detect flag to TRUE when the first and second carry-out bits have different logical values, and sets the zero detect flag to FALSE when the first and second carry-out bits have the same logical value.

37. The apparatus of claim 36, wherein the inspection circuit includes an EXCLUSIVE-OR gate which receives the first and second carry-out bits as inputs.

38. The apparatus of claim 35, wherein the inverter circuit is coupled to the first and second carry generators, and the first and second carry generators are coupled to the inspection circuit.

39. The apparatus of claim 35, wherein M is in the range of one to two.

40. The apparatus of claim 35, wherein M is two, and one of the subtrahends is a carry-in bit.

41. The apparatus of claim 35, wherein the first carry generator includes a first carry chain having a carry-in bit set to zero, and the second carry generator includes a second carry chain having a carry-in bit set to one.

42. The apparatus of claim 41, wherein the first and second carry generators include propagate-generate sections coupled to the first and second carry chains.

43. The apparatus of claim 42, wherein each of the propagate-generate sections is coupled to the first and second carry chains.

44. The apparatus of claim 42, wherein the M subtrahends consist of a single subtrahend, and the bit-complemented minuend and the single subtrahend are applied to the propagate-generate sections.

45. The apparatus of claim 42, wherein the M subtrahends consist of first and second subtrahends, the first and second carry generators include carry save adders coupled to the propagate-generate sections, the bit-complemented minuend and the first subtrahend are applied to carry save adders, and the second subtrahend is a carry-in bit that is applied to one of the propagate-generate sections.

46. The apparatus of claim 35, wherein the first and second carry-out bits are generated concurrently.

47. The apparatus of claim 35, wherein the first carry generator includes a sum adder which provides a sum of the bit-complemented minuend and the M subtrahends.

48. The apparatus of claim 35, wherein the second carry generator includes a sum adder which provides a sum of the bit-complemented minuend and the M subtrahends and the constant of one.

49. The apparatus of claim 35, wherein the first carry generator generates the first carry-out bit without calculating the sum of the bit-complemented minuend and the M subtrahends.

50. The apparatus of claim 35, wherein the second carry generator generates the second carry-out bit without calculating the sum of the bit-complemented minuend and the M subtrahends and the constant of one.

51. An apparatus for determining whether a difference of a minuend and M subtrahends is zero, wherein M is an integer of at least one, the apparatus comprising:

means for bit-complementing the minuend;

means for generating a first carry-out bit representing a carry-out bit of a sum of the bit-complemented minuend and the M subtrahends;

means for generating a second carry-out bit representing a carry-out bit of a sum of the bit-complemented minuend and the M subtrahends a constant of one; and means for determining whether the first carry-out bit and the second carry-out bit have different logical values, thereby setting a zero detect flag to TRUE.

52. The apparatus of claim 51, wherein M is one.

53. The apparatus of claim 51, wherein M is two, and one of the subtrahends is a carry-in bit.

54. The apparatus of claim 51, wherein the means for generating the first carry-out bit includes a first carry chain having a carry-in bit set to zero, and the means for generating the second carry-out bit includes a second carry chain having a carry-in bit set to one.

55. The apparatus of claim 54, wherein the means for generating the first carry-out bit and the means for generating the second carry-out bit include propagate-generate sections, and each of the propagate-generate sections is coupled to the first and second carry chains.

56. The apparatus of claim 51, wherein the means for determining the different logical values includes an EXCLUSIVE-OR gate for receiving the first and second carry-out bits.

57. The apparatus of claim 51, wherein the means for generating the first carry-out bit and the means for generating the second carry-out bit generate the first and second carry-out bits concurrently.

\* \* \* \* \*